(12) United States Patent
Shaw et al.

(10) Patent No.: US 10,960,615 B2
(45) Date of Patent: Mar. 30, 2021

(54) SYSTEM AND METHOD FOR LAMINATING A COMPOSITE LAMINATE ALONG A CONTINUOUS LOOP LAMINATION PATH

(71) Applicant: The Boeing Company, Chicago, IL (US)

(72) Inventors: Paul D. Shaw, Charleston, SC (US); James R. Kendall, Mt. Pleasant, SC (US); Raviendra S. Suriyaarachchi, Daniel Island, SC (US)

(73) Assignee: The Boeing Company, Chicago, IL (US)

( * ) Notice: Subject to any disclaimer, the term of this patent is extended or adjusted under 35 U.S.C. 154(b) by 266 days.

(21) Appl. No.: 16/190,144

(22) Filed: Nov. 13, 2018

(65) Prior Publication Data
US 2020/0147905 A1    May 14, 2020

(51) Int. Cl.
B29C 70/38    (2006.01)
(52) U.S. Cl.
CPC .......... B29C 70/388 (2013.01); B29C 70/386 (2013.01); Y10T 156/1788 (2015.01); Y10T 156/1795 (2015.01)
(58) Field of Classification Search
CPC ..... B29C 70/38; B29C 70/382; B29C 70/384; B29C 70/386; B29C 70/388; Y10T 156/1788; Y10T 156/1795
See application file for complete search history.

(56) References Cited

U.S. PATENT DOCUMENTS

| | | | |
|---|---|---|---|
| 7,137,182 B2 | 11/2006 | Nelson | |
| 7,527,759 B2 | 5/2009 | Lee et al. | |
| 7,655,168 B2 | 2/2010 | Jones et al. | |
| 7,879,177 B2 | 2/2011 | McCowin et al. | |
| 7,922,856 B2 | 4/2011 | Hagman et al. | |
| 8,012,291 B2 | 9/2011 | Kisch et al. | |
| 8,206,540 B2 | 6/2012 | Evans | |
| 8,336,596 B2 | 12/2012 | Nelson et al. | |
| 8,465,613 B2 | 6/2013 | Rotter et al. | |
| 8,640,757 B2 | 2/2014 | McCowin et al. | |
| 8,758,538 B2 | 6/2014 | Borgmann et al. | |
| 8,808,490 B2 | 8/2014 | Hagman et al. | |
| 9,314,974 B2 | 4/2016 | Buttrick | |
| 9,399,338 B1 | 7/2016 | Metschan | |

(Continued)

FOREIGN PATENT DOCUMENTS

DE    102013212332    12/2014
EP    2505343    10/2012

OTHER PUBLICATIONS

EPO, European Search Report for Appl. No. EP19203889, dated Mar. 31, 2020.

*Primary Examiner* — Carson Gross

(57) ABSTRACT

A manufacturing system includes a plurality of lamination heads and a head-moving system defining a continuous loop lamination path configured to move the lamination heads in series along the lamination path. The manufacturing system also includes at least one lamination mandrel positioned along a portion of the lamination path. The lamination heads are each configured to dispense a layup material onto the at least one lamination mandrel or onto layup material previously applied onto the lamination mandrel while the lamination heads are moved by the head-moving system through one or more revolutions of the lamination path to lay up a composite laminate.

20 Claims, 15 Drawing Sheets

(56) References Cited

U.S. PATENT DOCUMENTS

2005/0039843 A1\* 2/2005 Johnson .................. B29C 70/32
   156/175
2013/0153154 A1\* 6/2013 Boge ..................... B29C 70/382
   156/510
2017/0008197 A1 1/2017 Baeurle \* cited by examiner

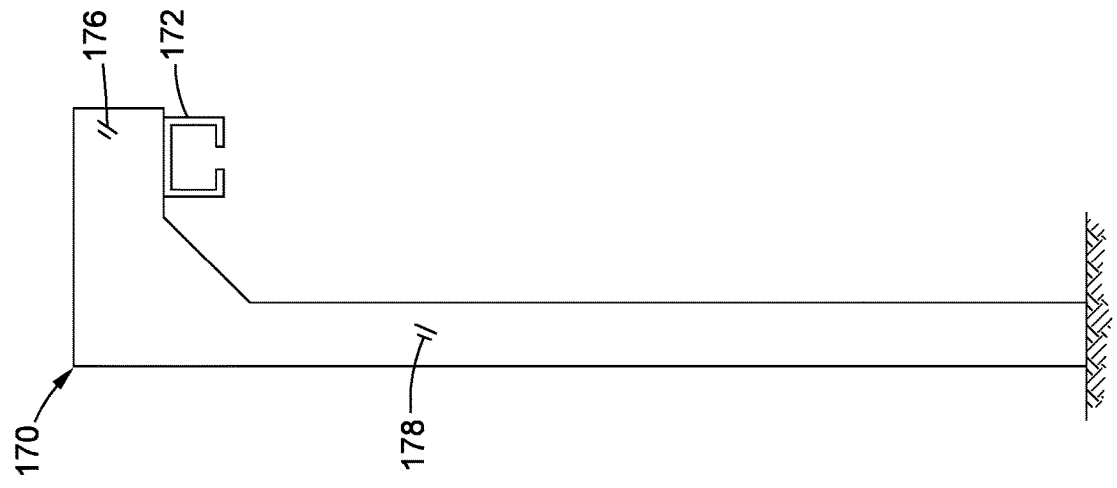
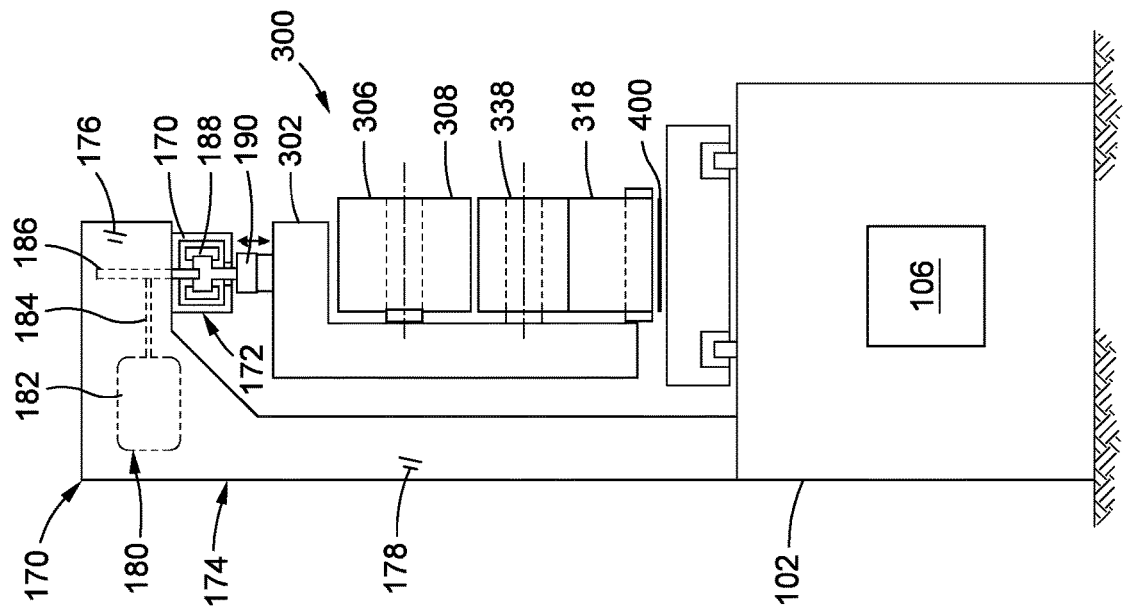

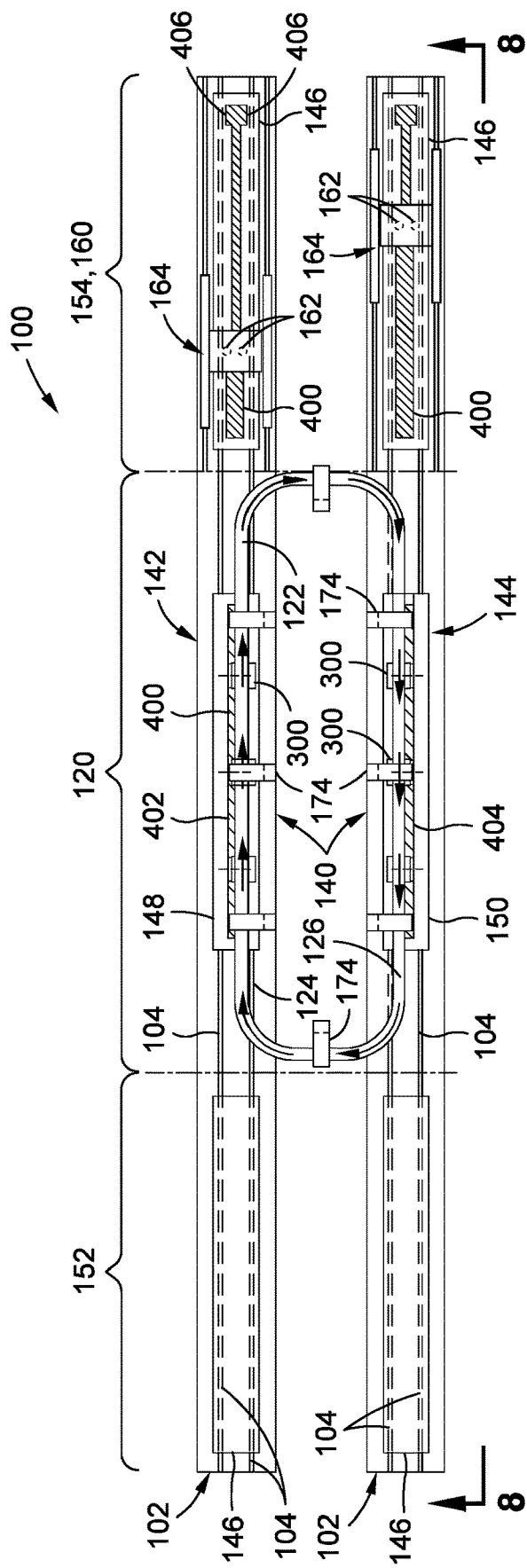
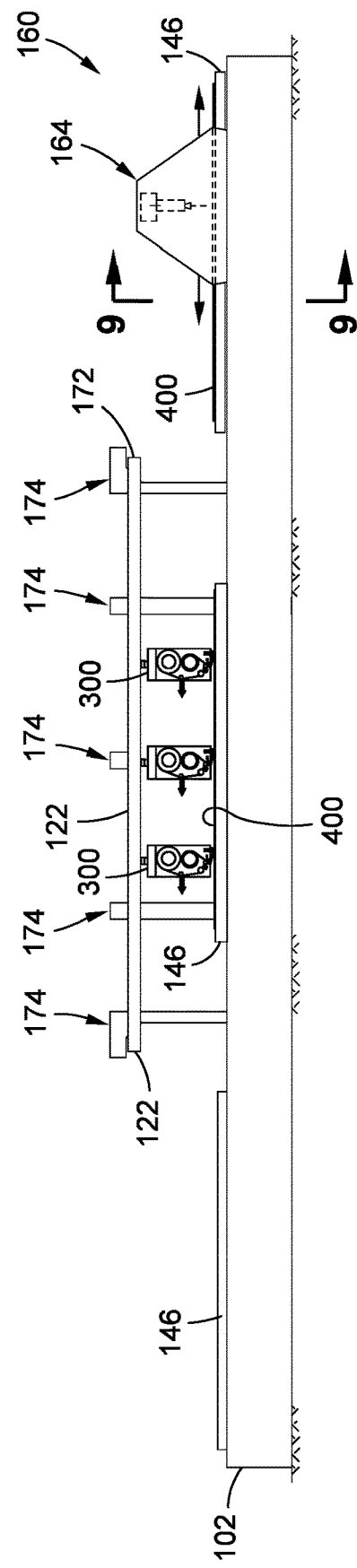
FIG. 7
FIG. 8

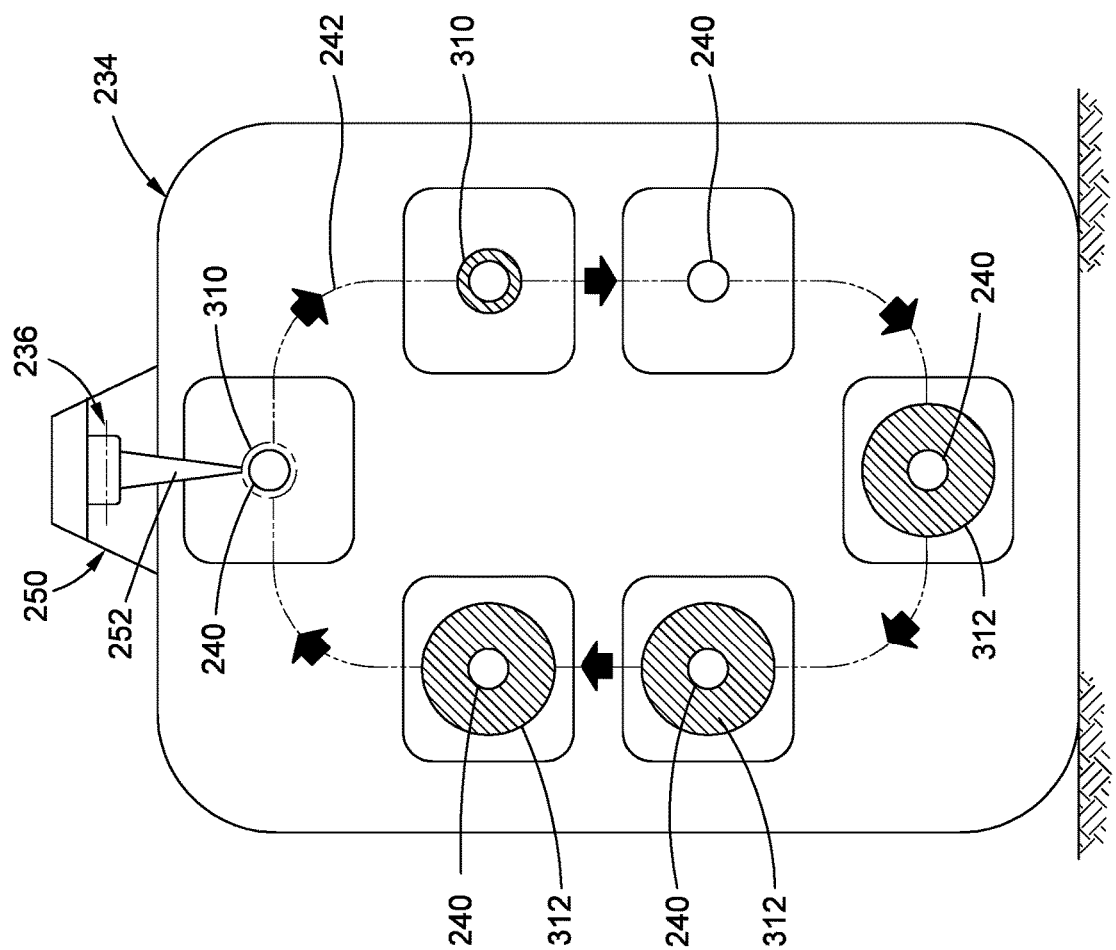

SYSTEM AND METHOD FOR LAMINATING A COMPOSITE LAMINATE ALONG A CONTINUOUS LOOP LAMINATION PATH

FIELD

The present disclosure relates generally to manufacturing systems and, more particularly, to a system and method for laminating a composite laminate along a continuous loop lamination path.

BACKGROUND

Composite materials are used in a wide variety of applications due to their favorable properties such as high specific strength, high specific stiffness, and high corrosion resistance. The manufacturing of a composite structure typically involves the layup of multiple composite plies of composite laminate material onto a mandrel to form a composite laminate. The layup material is typically a fibrous material that is pre-impregnated with resin (e.g., prepreg). For example, the layup material may be epoxy-impregnated carbon fiber prepreg.

Automated layup machines enable the layup of composite laminates at relatively high production rates due to the relatively high deposition rates of automated layup machines. A tape lamination head is one type of automated layup machine in which a continuous strip of layup material such as prepreg tape is dispensed from the lamination head onto a layup surface as the lamination head is moved over the layup surface.

A conventional lamination head may lay up each new course of tape while moving in a first direction of travel. At the end of a course, the lamination head lifts off of the layup surface and moves back over the layup surface in a second direction of travel opposite the first direction of travel and starts applying another course of tape along the first direction. The off-part movement of the lamination head each time it moves along the second direction undesirably adds to production flow time.

In an effort to reduce off-part movement, certain types of lamination heads may be configured to rotate 180 degrees at the end of a first course, and then reverse direction to lay up a second course of tape alongside or over the first course. The capability for rotating the lamination head adds complexity to the lamination system due to the need to rotate the entire weight of the lamination head, the material supply, support cabling, and other associated components. Further adding to the complexity is the need to temporarily lift the lamination head off of the layup surface prior to rotation, and then lower the lamination head back down onto the layup surface once rotation is complete.

Other efforts to reduce off-part movement include a dual-head arrangement having a first lamination head and an opposing second lamination head. The first lamination head is configured to lay up a first course of tape as the dual-head arrangement moves along a first direction of travel, and the second lamination head is configured to lay up a second course alongside or over the first course after the dual-head arrangement reverses direction and moves along a second direction of travel. Although effective in reducing off-part movement, a dual-head arrangement may increase the overall cost and complexity of the lamination system relative to the cost and complexity of a single lamination head.

As can be seen, there exists a need in the art for a system and method for manufacturing a composite laminate that avoids the above-noted challenges associated with off-part movement of lamination heads.

SUMMARY

The above-noted needs associated with manufacturing composite laminates are specifically addressed and alleviated by the present disclosure which provides a manufacturing system having a plurality of lamination heads and a head-moving system defining a continuous loop lamination path and configured to move the lamination heads in series along the lamination path. The manufacturing system also includes at least one lamination mandrel positioned along a portion of the lamination path. The lamination heads are configured to dispense a layup material onto the lamination mandrel or onto layup material previously applied to the lamination mandrel while the lamination heads are moved by the head-moving system through one or more revolutions of the lamination path to lay up a composite laminate.

In a further embodiment, disclosed is manufacturing system having a plurality of lamination heads, and a head-moving system defining a continuous loop lamination path and configured to move the lamination heads in series along the lamination path. The lamination path has a first side portion and a second side portion interconnected by a first end portion and a second end portion. The manufacturing system includes a first lamination mandrel positioned along the first side portion and defining a first lamination station, and a second lamination mandrel positioned along the second side portion and defining a second lamination station. The lamination heads are each configured to dispense a layup material onto the first lamination mandrel and the second lamination station or onto layup material previously applied to the first and second lamination mandrel while the lamination heads are moved by the head-moving system through one or more revolutions of the lamination path to lay up a first composite laminate and a second composite laminate respectively on the first lamination mandrel and the second lamination station.

Also disclosed is a method of manufacturing a composite laminate. The method includes moving, using a head-moving system, a plurality of lamination heads in series along a continuous loop lamination path, and applying layup material from the lamination heads onto at least one lamination mandrel or onto previously applied layup material while moving the lamination heads through one or more revolutions around the lamination path to thereby form a composite laminate. The at least one lamination mandrel is positioned along a portion of the lamination path.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 5 is a sectional view taken along line 5 of FIG. 2 and illustrating the lamination mandrel supported on a mandrel support member and further illustrating the track system supported by a track support structure configured as a cantilevered beam supported on a post extending upwardly from the mandrel support member;

FIG. 6 is a sectional view taken along line 6 of FIG. 2 and illustrating a track support structure extending upwardly from a surface such as a factory floor;

FIG. 7 is a top-down view of an example of a manufacturing system in which the lamination mandrel is movable between a mandrel holding position, a layup cell, and a mandrel exit position;

FIG. 8 is a side view of the manufacturing system taken along line 8 of FIG. 7;

FIG. 16 is a front view of the material holder showing a plurality of storage positions, one or more of which may include replacement material rolls;

DETAILED DESCRIPTION

Figure 1:
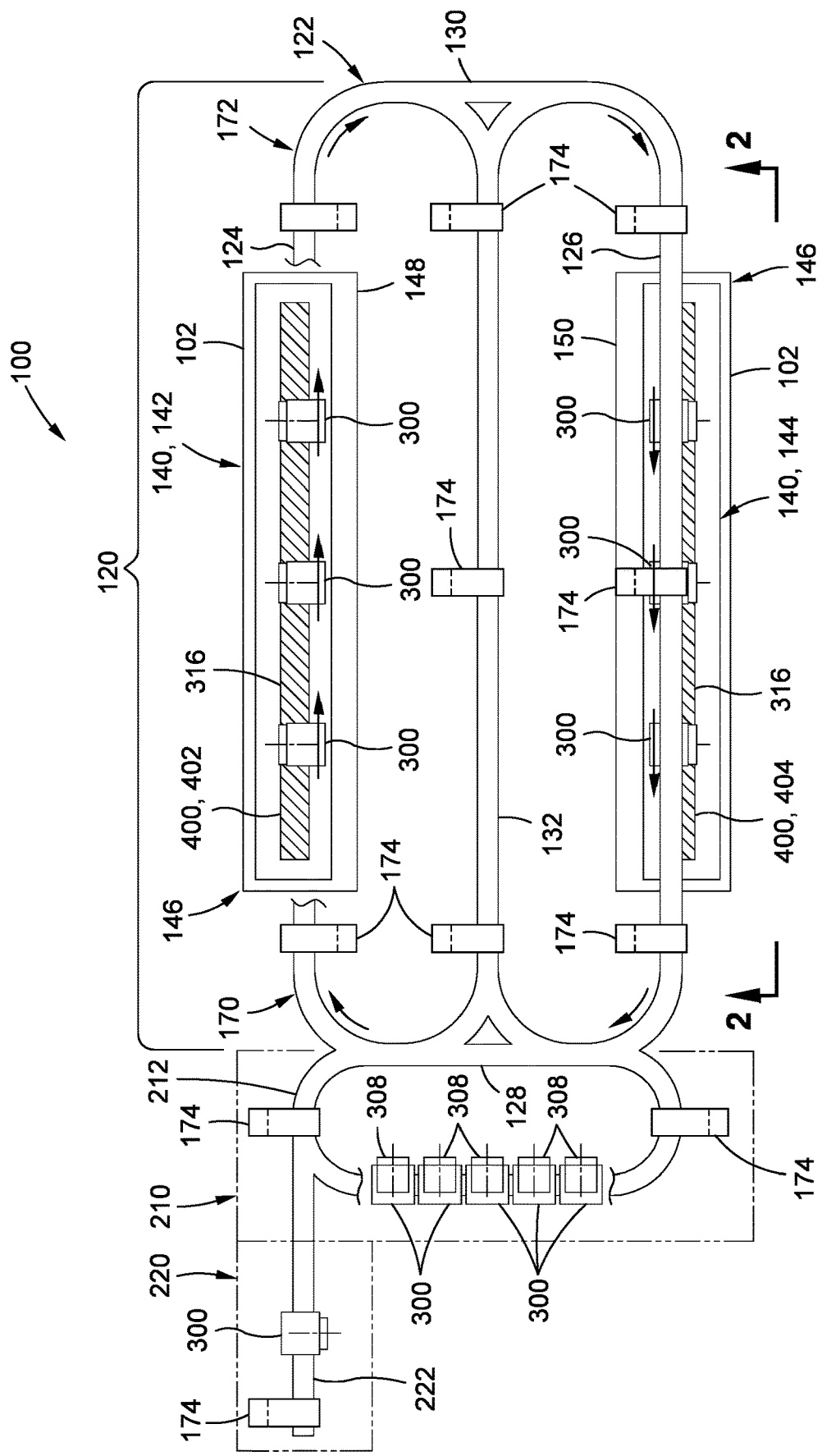
FIG. 1 is a top-down view of an example of a manufacturing system in which a plurality of lamination heads are moved around a continuous loop lamination path defined by a track system.
Figure 2:
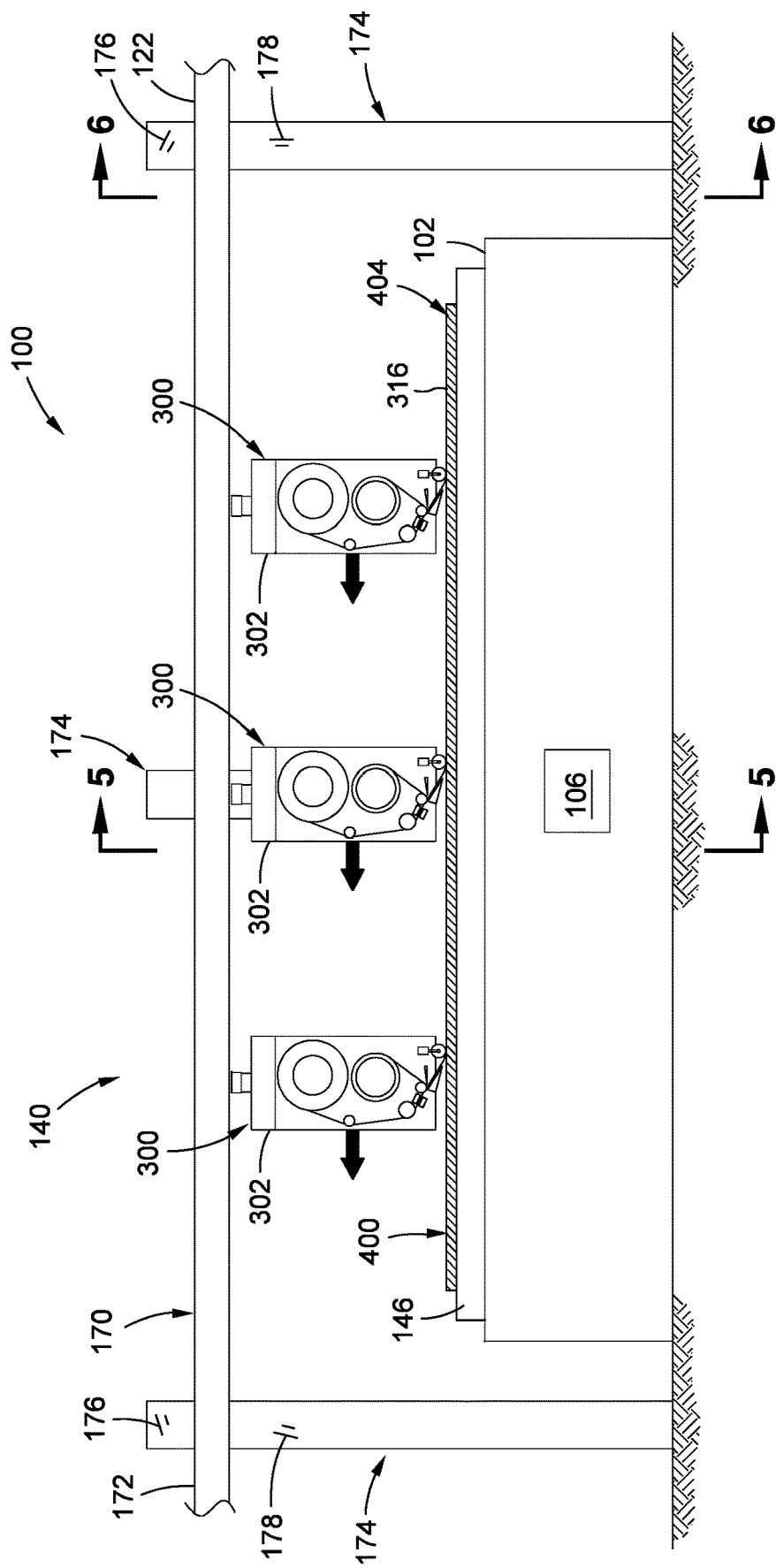
FIG. 2 is a side view of an example of a lamination station taken along line 2 of FIG. 1 and illustrating a statically positioned lamination mandrel upon which a composite laminate may be laid up by the plurality of lamination heads while moving around the track system.

Referring now to the drawings which illustrate preferred and various embodiments of the disclosure, shown in FIG. 1 is a top view of an example of a manufacturing system 100 having a plurality of lamination heads 300 that are movable along a continuous loop lamination path 122 for laying up one or more composite laminates 400 on one or more statically positioned lamination mandrels 146. The lamination heads 300 are each configured to dispense layup material 316 (FIG. 3) onto at least one lamination mandrel 146 or onto layup material 316 previously applied to a lamination mandrel 146 while the lamination heads 300 are moved along the lamination path 122. One or more of the lamination heads 300 may travel around the lamination path 122 in one or more revolutions or laps until achieving a desired laminate thickness of the one or more composite laminates 400. FIG. 2 is a side view of a lamination station 140 of FIG. 1 showing a plurality of lamination heads 300 moving over a lamination mandrel 146 and dispensing layup material 316 during the process of laying up a composite laminate 400 on the lamination mandrel 146.

The manufacturing system 100 includes a head-moving system 170 configured to move the lamination heads 300 in series along the lamination path 122. In addition, the head-moving system 170 includes or defines the lamination path 122. For example, in the manufacturing system 100 embodiments shown in FIGS. 1-8, 13-15 and 17-18, the head-moving system 170 includes a physical track system 172 which defines the lamination path 122 and on which the lamination heads 300 are supported. In the example of the manufacturing system 100 shown in FIGS. 10-12, the head-moving system 170 may comprise a head-moving robotic system 200 having one or more head-moving robotic devices 202 configured or programmed to move the lamination heads 300 along a predetermined lamination path 122. Advantageously, by moving a series of lamination heads 300 in a single direction along a continuous loop lamination path 122, the presently-disclosed manufacturing system 100 avoids the above-mentioned costs and complexities associated with lamination head direction reversal of conventional manufacturing systems. In addition, the presently-disclosed manufacturing system 100 reduces the amount of off-part movement associated with lamination head direction reversal. The reduction in off-part movement allows for an increase in the production rate for manufacturing composite laminates 400. For below-described examples of the manufacturing system 100 in which lamination heads 300 may be quickly replaced with replacements lamination heads, the manufacturing system 100 significantly reduces downtime in laying up composite laminates 400.

FIG. 1 illustrates an example of a lamination path 122 having a first side portion 124 and a second side portion 126 opposing the first side portion 124. The first side portion 124 and the second side portion 126 may be interconnected by a first end portion 128 and a second end portion 130 opposing the first end portion 128. At least one lamination mandrel 146 may be positioned along the first side portion 124 and/or the second side portion 126. For example, in FIG. 1, the manufacturing system 100 may include a first lamination mandrel 148 and a second lamination mandrel 150 positioned along the lamination path 122 and respectively defining a first lamination station 142 and a second lamination station 144. The first lamination station 142 may be located along the first side portion 124, and the second lamination station 144 may be located along the second side portion 126.

Referring to FIG. 1, in some examples of the manufacturing system 100, a lamination path 122 may include a center portion 132 extending between the first end portion 128 and the second end portion 130 and which may optionally be oriented parallel to the first side portion 124 and/or parallel to the second side portion 126. The head-moving system 170 may be configured to move the lamination heads 300 along the center portion 132 and bypassing either the first side portion 124 or the second side portion 126 during at least one revolution of the lamination heads 300 around the lamination path 122. Although not shown, the track system 172 including a path switch at the junction of the center portion 132 with the first end portion 128 and second end portion 130. Each path switch may be controlled by a controller 106 (FIG. 2) to direct the lamination mandrels 146 onto and off of the center portion 132 and bypassing the first side portion 124 or the second side portion 126. By directing the lamination heads 300 along the center portion 132, the side portion and lamination mandrel 146 that are bypassed may be accessible for performing maintenance while the lamination mandrel 146 at the remaining side portion is available to continue receiving layup material 316 from the lamination heads 300 for laying up a composite laminate 400. In some examples, the center portion 132 provides a means for shortening the length of the lamination path 122 when only a single lamination mandrel 146 is needed for laying up a composite laminate 400.

Although the manufacturing system 100 of FIG. 1 has a first lamination mandrel 148 and a second lamination mandrel 150, the manufacturing system 100 may include any number of lamination mandrels 146 statically respectively positionable at any number of locations along the lamination path 122. For example, in addition to or as an alternative to a first lamination mandrel 148 and a second lamination mandrel 150 respectively at the first side portion 124 and second side portion 126, the manufacturing system 100 may include a lamination mandrel 146 at the first end portion 128 and/or at the second end portion 130 of the lamination path 122. The technical effect of having more than one lamination mandrel 146 positioned along the lamination path 122 is an increase in the rate at which composite laminates 400 may be manufactured. For example, in FIG. 1, the first lamination mandrel 148 and the second lamination mandrel 150 allow for the laying up of a first composite laminate 402 on the first lamination mandrel 148 concurrent with the laying up of a second composite laminate 404 on the second lamination mandrel 150. Furthermore, although FIG. 1 shows the first lamination mandrel 148 and the second lamination mandrel 150 as being the same size and shape, a manufacturing system 100 may include one or more lamination mandrels 146 having a different size and/or different shape than one or more of the other lamination mandrels 146 along the lamination path 122. The different size and/or shape of the lamination mandrels 146 may accommodate the laying up of composite laminates 400 having different sizes and/or shapes.

In FIG. 1, the lamination path 122 has a generally rectangular shape in which the first side portion 124 and the second side portion 126 form the long sides of the rectangle and the first end portion 128 and second end portion 130 form the short sides of the rectangle. Although the lamination path 122 in FIG. 1 is shown having straight sides portions and straight end portions interconnected by radiused portions (e.g., each joining a straight side portion to a straight end portion), a lamination path 122 may be provided in an embodiment in which one or more of the side portions and/or end portions are curved instead of straight. In this regard, a lamination path 122 may be provided in any one of a variety of different sizes and/or shapes defining a continuous loop, and is not limited to a generally rectangular shape as shown in FIG. 1. For example, a lamination path 122 may have a rounded or circular shape (not shown), an elliptical shape (not shown) or any one a variety of continuous loop shapes. In some examples, one or more portions of a lamination path 122 may be shaped complementary to the shape of the composite laminates 400 to be laid up. Furthermore, one or more of the lamination mandrels 146 may be shaped complementary to the shape of the composite laminates 400 to be laid up. For example, a first lamination mandrel 148 may have a straight shape for laying up a first composite laminate 402 having a straight shape when viewed from a top-down direction, and which may be different than a second lamination mandrel 150 which have a non-straight shape (e.g., arc-shaped—not shown) for laying up a second composite laminate 404 having a non-straight shape.

Figure 3:
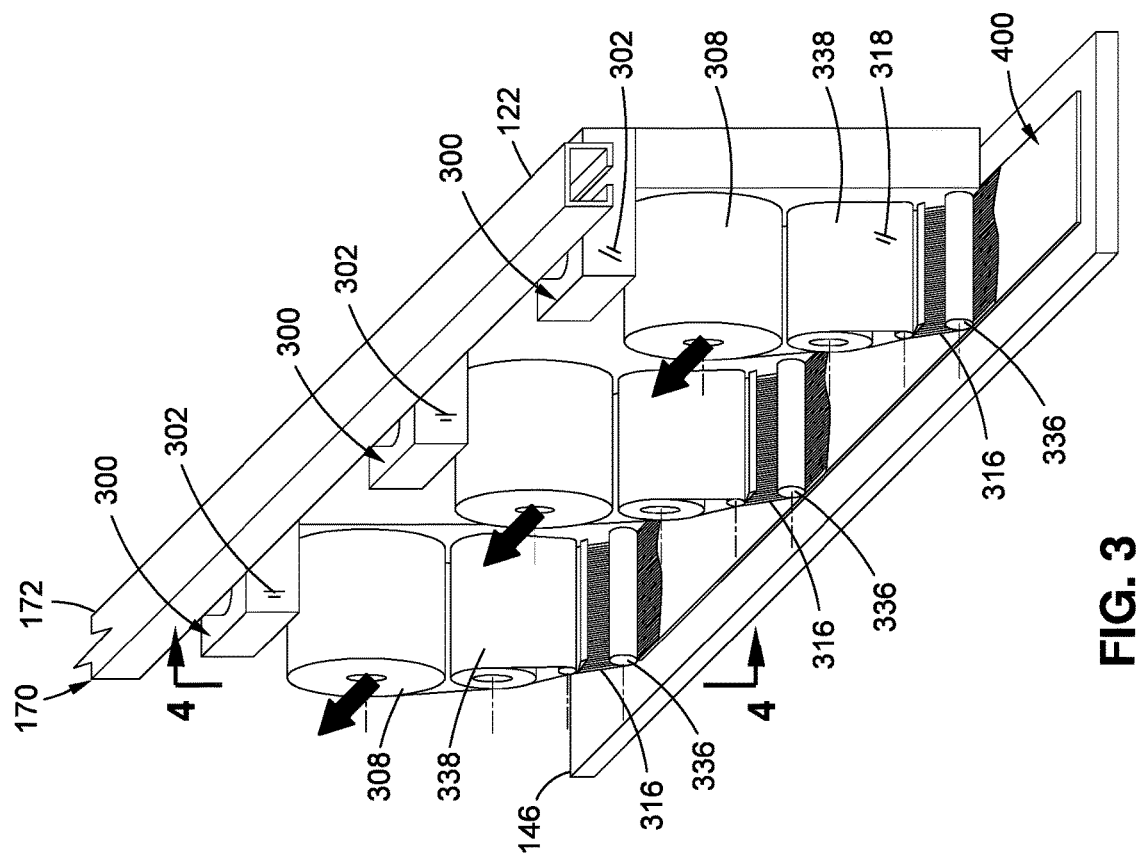
FIG. 3 is a perspective view of an example of three (3) lamination heads supported on the track system and laying up a composite laminate on a lamination mandrel.

Referring FIGS. 1-3, the head-moving system 170 may move the lamination heads 300 under command of a controller 106 (FIG. 2). In one example, the controller 106 may command the head-moving system 170 to move all of the lamination heads 300 at the same velocity along the lamination path 122 and maintain a predetermined distance between adjacent lamination heads 300. In an embodiment, the head-moving system 170 may move two or more of the lamination heads 300 as a group or unit. For example, referring to FIG. 1, the head-moving system 170 may move a first group of three (3) lamination heads 300 as a unit, and may move a second group of three (3) lamination heads 300 as a unit on an opposite side of the lamination path 122 from the first group of lamination heads 300. However, in an alternative embodiment, the head-moving system 170 may be configured to independently move any one or more of the lamination heads 300 while maintaining a minimum spacing between adjacent lamination heads 300. Although FIG. 1 shows a first plurality of lamination heads 300 grouped together and moving over the first lamination mandrel 148 and a second plurality of lamination heads 300 grouped together and moving over the second lamination mandrel 150, the manufacturing system 100 may be configured such that a majority or all of the lamination heads 300 on the lamination path 122 are uniformly spaced apart from each other resulting in a continuous succession of lamination heads 300 moving over the one or more lamination mandrels 146 and dispensing layup material 316 to thereby concurrently lay up one or more composite laminates 400 respectively on the one or more lamination mandrels 146.

Figure 4:
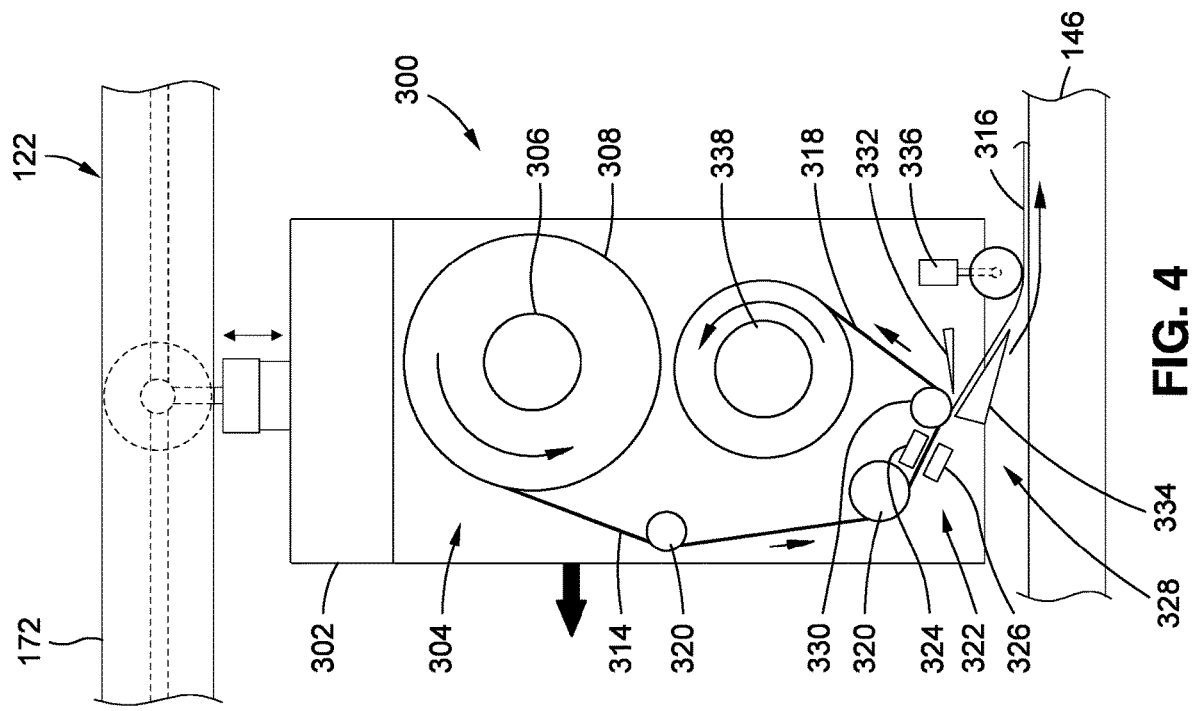
FIG. 4 is a side view of an example of a lamination head suspended from the track system.

Referring to FIGS. 3-4, shown in FIG. 3 is a perspective view of an example of three (3) lamination heads 300 supported on a track system 172 and dispensing layup material 316 during the laying up of a composite laminate 400 on a lamination mandrel 146. FIG. 4 is a side view of an example of one of the lamination head 300 of FIG. 3. As mentioned above, each lamination head 300 is configured to dispense layup material 316 while being moved along or over one or more lamination mandrels 146 statically positioned along the lamination path 122. Each lamination head 300 has head components 304 which may be mounted to a mounting frame 302 of the lamination head 300. In the example shown, the lamination head 300 is configured to dispense layup material 316 that is backed by a backing layer 318. The backing layer 318 may prevent adjacent wraps of layup material 316 from adhering to each other on a material roll 308 mounted on a material supply drum 306 of a lamination head 300. For lamination heads 300 configured to dispense layup material 316 having a backing layer 318, the head components 304 may include a material supply drum 306, a material dispensing mechanism 328, and a backing layer collection drum 338. A lamination head 300 may additionally include one or more redirect rollers 320 for orienting or guiding the backed material 314 through the head components 304 and/or for maintaining tension in the backed material 314 during the dispensing of layup material 316 from the lamination head 300. In addition, a lamination head 300 may include a compaction device 336 such as a compaction shoe or compaction roller for compacting the layup material 316 onto the lamination mandrel 146 or onto layup material 316 previously applied onto the lamination mandrel 146.

A lamination head 300 may additionally include a cutter assembly 322 for cutting the layup material 316 while leaving the backing layer 318 at least partially intact. In an embodiment, the cutter assembly 322 may include a cutter platen 324 and a cutter module 326 which cooperate to cut the layup material 316 upon command by the controller 106 (FIG. 2) to cut the layup material 316 as the lamination head 300 approaches a designated start location of a course of layup material 316 to be applied by the lamination head 300, and as the lamination head 300 approaches a designated end location of the course of layup material 316. Additionally, as described in greater detail below, the cutter assembly 322 of each lamination head 300 may be controlled to cut the layup material 316 in a manner to allow the lamination heads 300 to start and/or stop dispensing layup material 316 at the same or different starting locations and/or at the same or different stopping locations on the lamination mandrel 146, and which may result in one or more of the composite plies of a composite laminate 400 being partial plies, resulting in the composite laminate 400 having a non-constant laminate thickness along the lengthwise direction as may be defined by engineering requirements.

As mentioned above, the material supply drum 306 is configured to support a material roll 308. For examples where the material roll 308 is comprised of a backed material 314 made up of layup material 316 backed by a backing layer 318, the material dispensing mechanism 328 is configured to receive the backed material 314 from the material supply drum 306 and separate the backing layer 318 from the layup material 316. The material dispensing mechanism 328 may include a backing layer separation device 330, a backing layer separator 332, and a guide member 334. The backing layer separation device 330 and backing layer separator 332 may cooperate to separate the layup material 316 from the backing layer 318. The guide member 334 may guide the layup material 316 onto the lamination mandrel 146. The backing layer collection drum 338 is configured to take up the backing layer 318 after separation from the layup material 316 during dispensing of the layup material 316 onto a lamination mandrel 146. The backing layer 318 may be formed of a material that prevents adjacent wraps of layup material 316 from sticking to each other on the material roll 308. For example, the backing layer 318 may be a silicone-coated paper or the backing layer 318 may be a thin plastic film such as polyethylene film.

The layup material 316 may be a composite material for forming the composite laminate 400. For example, the layup material 316 may be provided as a continuous strip of dry (e.g., resin-free) layup material 316 or as fiber-reinforced polymer matrix material such as preimpregnated tape (i.e., prepreg tape). Alternatively, the layup material 316 may be a fabric textile or a non-fibrous material such as metallic mesh or metallic foil. The layup material 316 may be provided in any one a variety of thicknesses and widths. For example, prepreg tape may be provided in thicknesses of 0.007 inch or more, and in widths of 9-12 inches, although the layup material 316 may be provided in thicknesses of greater or less than 0.007 inch and/or in widths narrower than 9 inches or wider than 12 inches. One or more of the lamination heads 300 on the lamination path 122 may support material rolls 308 formed of slit tape which may be narrower than the prepreg tape supported on other lamination heads 300 on the lamination path 122.

The fibers in the prepreg tape may be randomly oriented, unidirectional, or arranged as a woven fabric. Prepreg tape having unidirectional fibers may be laid up in a manner to create a composite laminate 400 having a desired ply stacking sequence, as described below. For example, the lamination heads 300 may be arranged and operated in a manner to dispense unidirectional prepreg tape to lay up a composite laminate 400 having composite plies with relative fiber orientations of 0 degrees, 90 degrees, and/or ±45 degrees according to a desired ply stacking sequence of the composite laminate 400. The polymer matrix material in the prepreg tape may be a thermosetting resin or a thermoplastic resin. The fibers may be carbon fibers or the fibers may be formed of alternative materials such as glass, boron, aramid, ceramic or other non-metallic or metallic material. Prepreg tape may also be provided with carbon fibers and metallic fibers or mesh to provide integral lighting strike protection for the composite laminate 400.

For materials for which there may not be a backing layer 318, a backing layer collection drum 338 and associated backing layer separation hardware (e.g., backing layer separation device 330, backing layer separator, etc.) may be omitted from the lamination head 300, or such backing layer collection drum 338 and associated backing layer separation hardware may be non-used or inactive during the dispensing of such materials. Examples of materials that may not have a backing layer 318 include metallic foils, metallic mesh, and certain films or layers that are non-tacky. For example, certain thermoplastic materials and/or certain processing films such as release film, breather layer, bleeder layer, bagging film and/or other materials described below may be dispensed using a lamination head (not shown) that lacks a backing layer collection drum 338 and associated backing layer separation hardware.

The lamination heads 300 may be positioned along the lamination path 122 to sequentially apply the layup material 316 to form a composite laminate 400 as a stack of composite plies arranged in a desired ply stacking sequence. In one example, the ply stacking sequence may be defined by the positions of the lamination heads 300 relative to each other along the lamination path 122. The ply stacking sequence of a composite laminate 400 may be based on the end use of the composite laminate 400. More specifically, the composite laminate 400 may be designed with a certain ply stacking sequence based on a set of predetermined design loads to which the final composite laminate (e.g., after curing) may be subjected when in service. In this regard, the order of the lamination heads 300 along the lamination path 122 may be dictated by the end use of the composite laminate 400.

For example, in FIG. 3, each one of the three (3) lamination heads 300 moving over the lamination mandrel 146 may be loaded with a material roll 308 of layup material 316 having a material configuration that corresponds to the desired ply stacking sequence of the composite laminate 400. A first one of the three (3) lamination heads 300 may be loaded with layup material 316 having a material configuration comprised of 0/90-degree woven prepreg tape, a second one of the three (3) lamination heads 300 may be loaded with layup material 316 having a material configuration comprised of 0-degree unidirectional prepreg tape, and a third one of the three (3) lamination heads 300 may be loaded with layup material 316 having a material configuration comprised of 90-degree unidirectional prepreg tape. In FIG. 1, the first group of three (3) lamination heads 300 moving over the first lamination mandrel 148 may be loaded with layup material 316 having the same or different material configuration as the second group of three (3) lamination heads 300 moving over the second lamination mandrel 150. However, as mentioned above, a manufacturing system 100 may include any number of lamination heads 300 movable along the lamination path 122 and may be configured to dispense any one a variety of different material configurations and/or different material widths of layup material 316, and are not limited to the above-described arrangement illustrated in FIG. 1. In this regard, the lamination heads 300 may be arranged in any number of groups or the lamination heads 300 may be non-grouped and may be uniformly or non-uniformly spaced relative to each other along the lamination path 122. The lamination heads 300 may be commanded to travel around the lamination path 122 in one or more revolutions to achieve the desired laminate thickness and desired ply stacking sequence of the composite laminates 400 being laid up.

In some examples, as a means to achieve a desired ply stacking sequence in a composite laminate 400, the controller 106 may command one or more of the lamination heads 300 to refrain from dispensing layup material 316 during one or more passes along at least one lamination mandrel 146 while the remaining lamination heads 300 continue dispensing layup material 316 onto the lamination mandrel 146. For examples in which there are multiple lamination heads 300 on the lamination path 122 that are loaded with the same type of layup material 316, the lamination heads 300 may be commanded or programmed to cause the first available lamination head 300 (e.g., the lamination head 300 nearest an approaching lamination station 140) having the required type of layup material 316 to dispense layup material 316 according to the ply stacking sequence, instead of a conventional laminating arrangement in which each lamination head 300 is configured to form a specific composite ply of a composite laminate 400. Advantageously, the above-described arrangement allowing interchangeability of lamination heads 300 for forming specific composite plies in a composite laminate 400 allows for flexibility in moving one or more lamination heads 300 off the lamination path 122 (e.g., into the staging bay 210, maintenance bay 220, or reloading bay 230) for servicing (e.g., material roll changeouts, head component maintenance, etc.), while the remaining lamination heads 300 on the lamination path 122 continue laying up composite laminates 400, and which thereby minimizes downtime of the manufacturing system 100.

In some examples, in order to form a lengthwise gap or ply drop (not shown) in a selected one or more of the composite plies of a composite laminate 400, the controller 106 may command one or more of the lamination heads 300 to momentarily stop and then restart the dispensing of layup material 316 while the remaining lamination heads 300 continuously dispense layup material 316 onto a lamination mandrel 146. Alternatively, a lamination head 300 may be commanded to stop dispensing layup material 316 without restarting, while the remaining lamination heads 300 continuously dispense layup material 316 onto the lamination mandrel 146. The resulting lengthwise gap(s) or ply drop(s) in one or more composite plies of the composite laminate 400 results in the laminate thickness varying or being non-constant along the length of the composite laminate 400 as may be defined by engineering requirements. Even further, the controller 106 may command one or more of the lamination heads 300 to intentionally delay dispensing layup material 316 onto a lamination mandrel 146 after the remaining lamination heads 300 have started to dispense layup material 316 at a common location on a lamination mandrel 146. As may be appreciated, the starting and/or stopping of layup material 316 from the lamination heads 300 may be controlled in any number of ways in order to achieve a desired laminate thickness variation along the length of a composite laminate 400.

In addition to dispensing composite layup material 316 such as prepreg tape, one or more of the lamination heads 300 may be loaded with a material roll 308 of layup material 316 provided as processing material to facilitate processing of the composite laminate 400. As mentioned above, such processing material may include a release film, a tackifier film, a breather layer, a bleeder layer, peel ply, bagging film, or any one a variety of other layers, films, or adhesives that may be laid up prior to or during the laying up of the composite laminate 400. The processing layers may facilitate any one of a variety of processing activities including, but not limited to, layup, debulking, trimming, forming, and/or curing of the composite laminate 400. The technical effect of dispensing processing material is a reduction in the amount of time required for performing such processing activities relative to the amount of time required for manually applying such processing materials onto a lamination mandrel 146 or a composite laminate 400. As mentioned above, certain materials and/or processing films or layers (e.g., non-tacky materials) may be dispensed using a lamination head (not shown) that lacks a backing layer collection drum 338 and associated backing layer separation hardware.

Referring to FIGS. 1-6, the head-moving system 170 may include a physical track system 172 configured to support the lamination heads 300 along the lamination path 122. However, as mentioned above, the lamination heads 300 may be moved around the lamination path 122 using any one of a variety of alternative means including, but not limited to, a rack-and-pinion arrangement (not shown), a screw drive arrangement (not shown) or other geared systems (not shown), or the lamination heads 300 may be moved using a head-moving robotic system 200 (e.g., FIGS. 11-13) as described below. In the embodiment shown in FIGS. 1-6, the track system 172 may be provided as an overhead track defining the lamination path 122. In FIGS. 1-2, the track system 172 may be supported by a plurality of track support structures 174 positioned at spaced locations along the lamination path 122 to support the combined weight of the track system 172 and the lamination heads 300. The track system 172 may be suspended from one or more of the track support structures 174. The technical effect of supporting the lamination heads 300 using a physical track system 172 is a relatively high level of precision and accuracy in controlling the positioning (e.g., lateral positioning) and forward movement (e.g., head speed) of the lamination heads 300 during the dispensing of layup material 316.

FIGS. 5-6 are cross-sectional view of the example manufacturing system 100 of FIGS. 1-2 showing examples of track support structures 174 configured as cantilevered beams 176 supported on posts 178. FIG. 5 shows the track system 172 coupled to a cantilevered beam 176 supported on a post 178 extending upwardly from a mandrel support member 102. FIG. 6 shows the track system 172 coupled to a cantilevered beam 176 supported on a post 178 extending upwardly from a factory floor. As may be appreciated, the track system 172 may be supported by any one of a variety of track support structure 174 configurations including, but not limited to, a track support crossbeam (not shown) supported on opposing ends by a pair of posts 178. In a further embodiment, the track support structure 174 may comprise a plurality of hanger beams (not shown) extending downwardly from an overhead structure (not shown) such as a factory ceiling.

In FIG. 5, the head-moving system 170 may include a plurality of head carriages 188 respectively coupling the plurality of lamination heads 300 to the track system 172. Each one of the head carriages 188 may include bearings, rollers and/or sliding blocks incorporated into and movable along the track system 172 for moving a lamination head 300 along the lamination path 122. The head-moving system 170 may further include a head drive mechanism 180 comprising one or more motors 182 each having a shaft 184 for rotatably driving a gear or sprocket 186 for moving the lamination heads 300 along the track system 172. The head drive mechanism 180 may further include cables (not shown) and/or chains (not shown) interconnecting the lamination heads 300 in an arrangement similar to a conveyor system for driving the lamination heads 300 around the track system 172. Alternatively or additionally, the head drive mechanism 180 may include one or more linear actuation systems (not shown) in a geared arrangement, such as a rack-and-pinion system or a screw drive driven by one or more servo motors for moving the lamination heads 300 around the track system 172.

Referring still to FIG. 5, in an embodiment, one or more of the head carriages 188 may include a vertical translation mechanism 190 coupling the mounting frame 302 to the head carriage 188. The vertical translation mechanism 190 may be configured to raise and lower the lamination head 300 upon command by the controller 106 in coordination with movement of the lamination head 300 along the lamination path 122. For example, the controller 106 may command the vertical translation mechanism 190 to lower the lamination head 300 onto the lamination mandrel 146 at a designated start location (not shown) of a course of layup material 316 (FIGS. 3-4) to be dispensed by the lamination head 300, and raise the lamination head 300 off of the lamination mandrel 146 at a designated end location (not shown) of the course of layup material 316.

Referring to FIG. 1, some examples of the manufacturing system 100 may include a staging bay 210 having a staging path 212 connected to the lamination path 122. The staging bay 210 may store one or more lamination heads 300 on the staging path 212 as replacements for one or more of the lamination heads 300 on the lamination path 122. In this regard, one or more lamination heads 300 may be stored in the staging bay 210 while the lamination heads 300 on the lamination path 122 continue to lay up composite laminates 400 on one or more lamination mandrels 146 positioned along the lamination path 122. The above-described head-moving system 170 may move one or more of the lamination heads 300 between the lamination path 122 and the staging path 212 under command of the controller 106. For example, a lamination head 300 on the lamination path 122 may be moved to the staging bay 210 when the lamination head 300 requires maintenance and/or when a material roll 308 (FIG. 4) of the lamination head 300 is nearing depletion, and replaced with a lamination head 300 in optimal working condition and/or one that is loaded with a new or full material roll 308 of the same material configuration as the replaced lamination head 300. In other examples, the lamination head 300 on the lamination path 122 may be moved to the staging bay 210 and replaced with a lamination head 300 that is loaded with layup material 316 of a different material configuration than currently loaded on the lamination head 300. Such different material configuration may be required by the ply stacking sequence of a composite laminate 400 currently being laid up. Additionally, the staging bay 210 may store one or more lamination heads 300 loaded with non-composite material such as metallic mesh, metallic foil, and other non-composite materials. The technical effect of the staging bay 210 is the capability to store lamination heads 300 in close proximity to the main lamination path 122 to allow for quick changeout of lamination heads 300 as a means to reduce or minimize downtime in laying up composite laminates 400 and thereby maximize throughput of the manufacturing system 100.

In still further examples, the staging bay 210 may include one or more lamination heads 300 loaded with material rolls 308 of processing material that may facilitate the processing of a composite laminate 400. For example, a staging bay 210 may include a lamination head 300 loaded with a material roll 308 comprised of tackifier film which may be applied onto each lamination mandrel 146 prior to the dispensing of composite layup material 316 by other lamination heads 300 in the lamination path 122. A tackifier film may improve adhesion between the lamination mandrel 146 and the layup material 316 dispensed by the lamination heads 300, and may thereby avoid movement of the composite laminate 400 during layup which may improve the dimensional accuracy of the completed composite laminate 400. In a further example, a staging bay 210 may include a lamination head 300 loaded with peel ply (e.g., fluorinated ethylene propylene) which may be applied as a protective layer to the outermost surface of the composite laminate 400 after layup is complete as a means to preserve the bondability of the outermost surface of the composite laminate 400 after removal of the peel ply. As may be appreciated, the staging bay 210 may include any number of lamination heads 300 loaded with any one a variety of different types of processing materials, and is not limited to tackifier film and peel ply. The technical effect of storing one or more lamination heads 300 loaded with processing materials in a staging bay 210 is reducing or avoiding the need for a dedicated cell (i.e., floorspace) and/or personnel otherwise required for applying such processing materials.

The staging path 212 may be configured as a track system 172 and may be connected to the track system 172 of the lamination path 122 at a location outside of the lamination station 140. For example, FIG. 1 shows a staging path 212 located proximate the first end portion 128 of the lamination path 122. However, the manufacturing system 100 may include any number of staging paths 212 located at any location along a lamination path 122. For example, a manufacturing system 100 may include a staging path 212 located at the first end portion 128 and a staging path 212 located at the second end portion 130 of the lamination path 122. In some examples, the staging path 212 may be formed as a continuous loop. The staging path 212 may use at least a portion of the lamination path 122 to form the staging path 212 as a continuous loop. For example, in FIG. 1, the first end portion 128 of the lamination path 122 forms a portion of the staging path 212. Although the staging bay 210 is shown as a continuous loop path having a rounded rectangular shape, the staging path 212 may be configured in any one of a variety of shapes, and may be arranged in a non-loop shape (not shown). The track system 172 may include a path switch (not shown) at each junction of the staging path 212 with the lamination path 122. For example, in FIG. 1, a path switch may be located at each junction of the staging path 212 with the first end portion 128. The path switch may be controlled by the controller 106 and may be configured to direct the lamination mandrels 146 onto and off of the staging path 212.

Referring still to FIG. 1, the manufacturing system 100 may include a maintenance bay 220 having a spur path 222 configured as a track system 172 and which may be connected to the track system 172 of the lamination path 122. The maintenance bay 220 may be configured for extended maintenance of a lamination head 300 beyond the maintenance capabilities of the staging bay 210. The technical effect of the maintenance bay 220 is the capability to repair and/or overhaul a lamination head 300. Alternatively or additionally, the maintenance bay 220 may provide the capability for reconfiguring or replacing one or more head components 304 of a lamination head 300 to be compatible with layup material 316 that may be of a different configuration than the layup material 316 currently loaded on the lamination head 300. The maintenance bay 220 may also provide the capability for replacing (e.g., manually) a material roll 308 on one or more lamination heads 300. The head-moving system 170 may allow for motorized movement or manual movement of the lamination heads 300 between the staging path 212 and the spur path 222. In this regard, the head-moving system 170 may move one or more lamination heads 300 from the staging path 212 to the spur path 222, and from the spur path 222 to the staging path 212. The track system 172 may include a path switch (not shown) at the junction of the spur path 222 with the staging path 212. The path switch may be controlled by the controller 106 and may be configured to direct the lamination mandrels 146 into and out of the spur path 222.

Referring to FIGS. 7-8, shown is an example of a manufacturing system 100 in which one or more lamination mandrels 146 is movable between a mandrel holding position 152, a layup cell 120, and a mandrel exit position 154. FIG. 7 is a top view of the manufacturing system 100 showing a first lamination mandrel 148 at a first lamination station 142, and a second lamination mandrel 150 at the second lamination station 144. FIG. 8 is a side view of the manufacturing system 100. The manufacturing system 100 includes a pair of mandrel support members 102 extending in parallel alignment respectively to the first side portion 124 and the second side portion 126 of the lamination path 122. The mandrel support members 102 each extend from the mandrel holding position 152 to the mandrel exit position 154. Each one of the mandrel support members 102 may include a means for translating the lamination mandrels 146 from the mandrel holding position 152 to the layup cell 120 and from the layup cell 120 to the mandrel exit position 154. For example, each mandrel support member 102 may include longitudinal rails 104 enabling slidable translation of the lamination mandrels 146. In addition, each mandrel support member 102 may include a linear actuation mechanism (not shown) for translating a lamination mandrel 146 along the longitudinal rails. Alternatively, a robotic device (not shown) or other non-rail mechanism (not shown) may be implemented for moving the lamination mandrel 146. In a further example, the lamination mandrels 146 may be manually moved (e.g., by a technician) from the mandrel holding position 152 to the layup cell 120 and/or manually moved from the layup cell 120 to the mandrel exit position 154.

In FIG. 7-8, each mandrel support member 102 may store a lamination mandrel 146 in the mandrel holding position 152 while a composite laminate 400 is laid up on a lamination mandrel 146 positioned at a lamination station 140 within the layup cell 120. Upon completion of the composite laminate 400 at the lamination station 140, the lamination mandrel 146 in the layup cell 120 may be moved to the mandrel exit position 154, and the lamination mandrel 146 in the mandrel holding position 152 may be moved to the lamination station 140 in the layup cell 120 for laying up another composite laminate 400 using the series of lamination heads 300 on the lamination path 122. Advantageously, the mandrel holding position 152 and mandrel exit position 154 provide a means for rapid movement of lamination mandrels 146 into and out of each lamination station 140 which may reduce or minimize downtime of the lamination heads 300 in laying up composite laminates 400 and may thereby allow for an increased rate of production of composite laminates 400 relative to conventional composite manufacturing systems.

Although not shown, the manufacturing system 100 may include a means for indexing each lamination mandrel 146 (e.g., first and second lamination mandrel 148, 150) to a predetermined location at each lamination station (e.g., first and second lamination station 142, 144). For example, such means for indexing a lamination mandrel 146 at a lamination station 140 may include one or more mechanical features (not shown) that may be included on the lamination mandrels and/or on the mandrel support members 102. Alternatively or additionally, the means for indexing a lamination mandrel 146 at a lamination station 140 may include an optical system (e.g., a laser device) included with the mandrel support members 102 and configured to register with one or more reflective targets on the lamination mandrels 146. As may be appreciated, the manufacturing system 100 may include any one or more of a variety of system configurations for repeatably indexing lamination mandrels 146 to a lamination station 140 when moving a lamination mandrel 146 from the mandrel holding position 152 to a lamination station 150.

Figure 9:
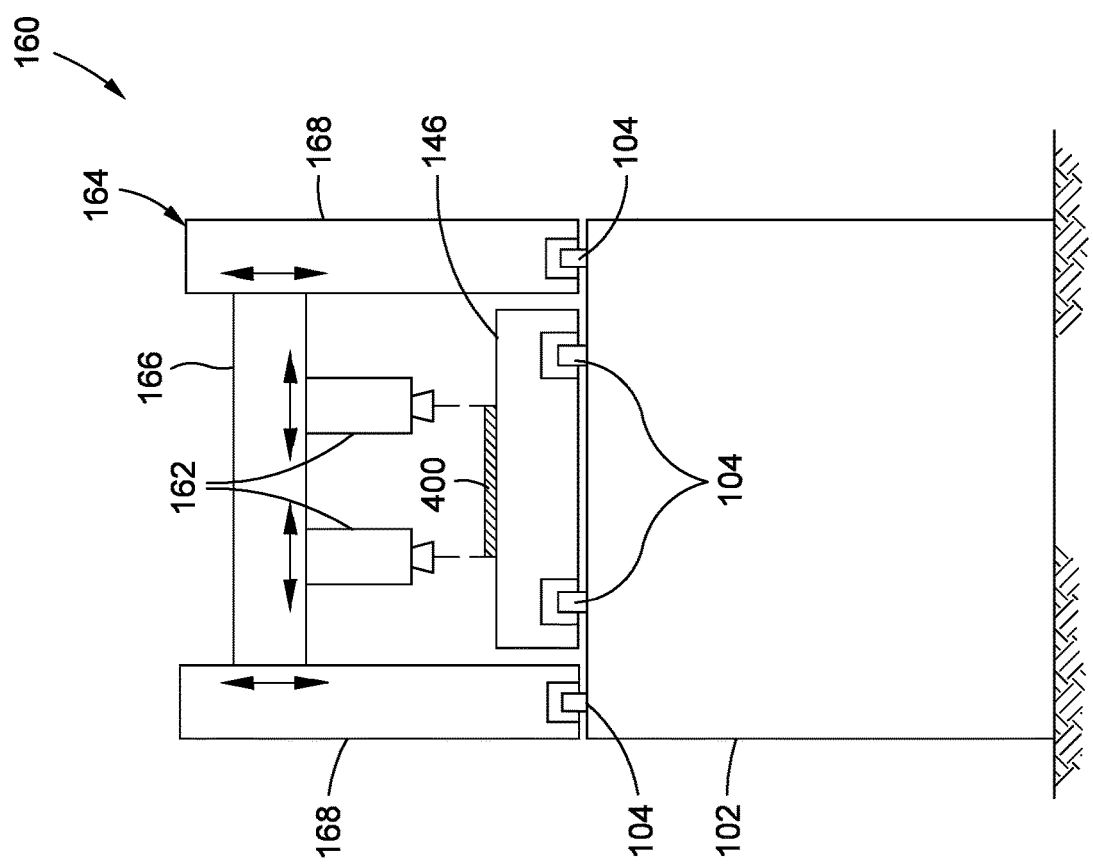
FIG. 9 is a sectional view taken along line 9 of FIG. 8 and illustrating a gantry supporting trimming devices located in the mandrel exit position.

Referring still to FIGS. 7-9, in some examples of the manufacturing system 100, the mandrel exit position 154 may be configured as a trimming cell 160 where a composite laminate 400 may be trimmed after layup is complete. The trimming cell 160 may include one or more trimming devices 162 for trimming the composite laminate 400. FIG. 9 is a sectional view of an example of an overhead gantry 164 configured to support one or more trimming devices 162 located in the mandrel exit position 154. An overhead gantry 164 may have a crossbeam 166 with opposing end coupled respectively to a pair of beam supports 168. The crossbeam 166 may be vertically translatable relative to the beam supports 168 for adjusting the vertical height of the trimming devices 162 relative to the composite laminate 400. The beam supports 168 may be horizontally translatable along the mandrel support member 102 for moving the trimming devices 162 along the length of the composite laminate 400 during trimming. As an alternative to horizontally translating the trimming devices 162 via the gantry 164 during trimming of a composite laminate 400, the trimming devices 162 may be horizontally stationary and the composite laminate 400 may be trimmed as the lamination mandrel 146 exits the layup cell 120 and enters the mandrel exit position 154.

The trimming devices 162 may be supported by any one a variety of structural arrangements and are not limited to an overhead gantry 164 as shown in FIG. 7-9. For example, the trimming devices 162 may be supported by a cantilevered beam arrangement, one or more robotic devices, or other arrangements. The trimming devices 162 may comprise one or more ultrasonic knives, laser devices, mechanical cutter blades or any one of a variety of other cutting mechanisms. The trimming devices 162 may be configured to trim the side edges of a composite laminate 400 and/or form geometry in or along the sides or ends of the composite laminate 400 such as forming tab outs 406 (FIG. 7). The technical effect of configuring the mandrel exit position 154 as a trimming cell 160 is the ability to trim a composite laminate 400 on the same manufacturing system 100 as for laying up the composite laminate 400, and thereby avoiding the cost and complexity associated with transporting the composite laminate 400 to a dedicated trimming station (not shown). In this regard, the trimming of composite laminates 400 in the trimming cell 160 may increase the rate of production of composite laminates 400.

The mandrel exit position 154 may provide a location for off-loading or removing the composite laminate 400 from the lamination mandrel 146 to another location without interrupting the ongoing layup of another composite laminate 400 in the layup cell 120. For example, a composite laminate 400 in the mandrel exit position 154 may be off-loaded from the lamination mandrel 146 by pick-and-place removal (not shown) from the lamination mandrel 146 and transportation of the composite laminate 400 to another location for post-processing.

The mandrel exit position 154 may also provide a location for pre-kitting the composite laminate 400 in preparation for downstream processing. For example, prior to off-loading, the composite laminate 400 may be pre-kitted with materials and components used in post-processing of the composite laminate 400. For example, the composite laminate 400 may be pre-kitted with peel ply, release film, breather cloth, bagging film, bladders, edge sealant, vacuum fittings, caul plates, radius fillers, and any one or more of a variety of other materials and/or components that may be used in any one a variety of post-processing operations. The composite laminate 400 and the pre-kitted materials components may be collectively off-loaded from the lamination mandrel 146 and transported to the next processing location. After the composite laminate 400 and optional pre-kitting components have been removed from the lamination mandrel 146 in the mandrel exposition, the lamination mandrel 146 may be circulated back to the mandrel holding position 152 by any one a variety of means including a conveyor system (not shown), an overhead gantry 164 (not shown), one or more robotic devices (not shown), or other means.

Figure 10:
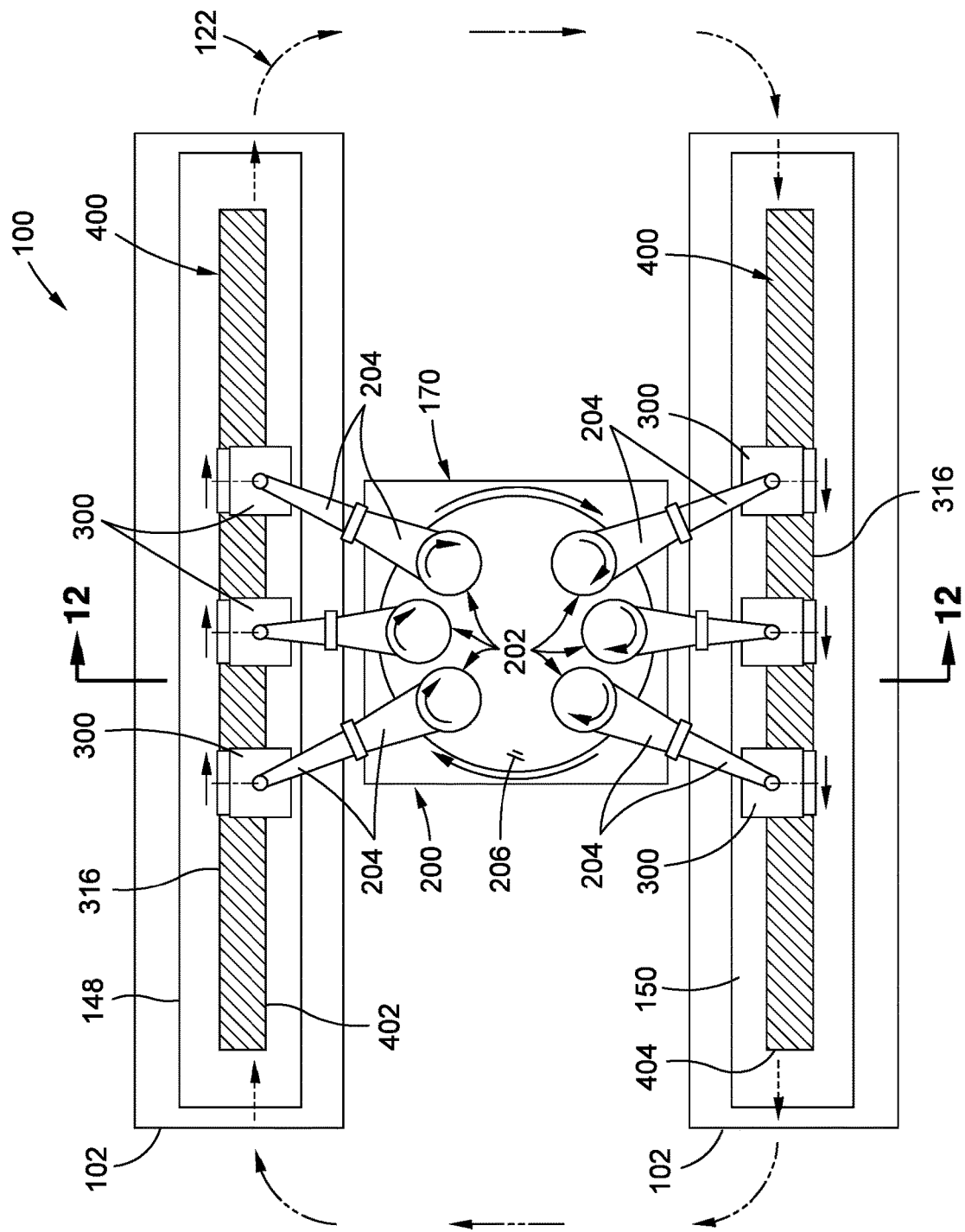
FIG. 10 is a top-down view of an example of a manufacturing system having a head-moving robotic system including a plurality of lamination heads supported by a plurality of head-moving robotic devices configured to move the lamination heads along the lamination path for laying up one or more composite laminates respectively on one or more lamination mandrels.
Figure 11:
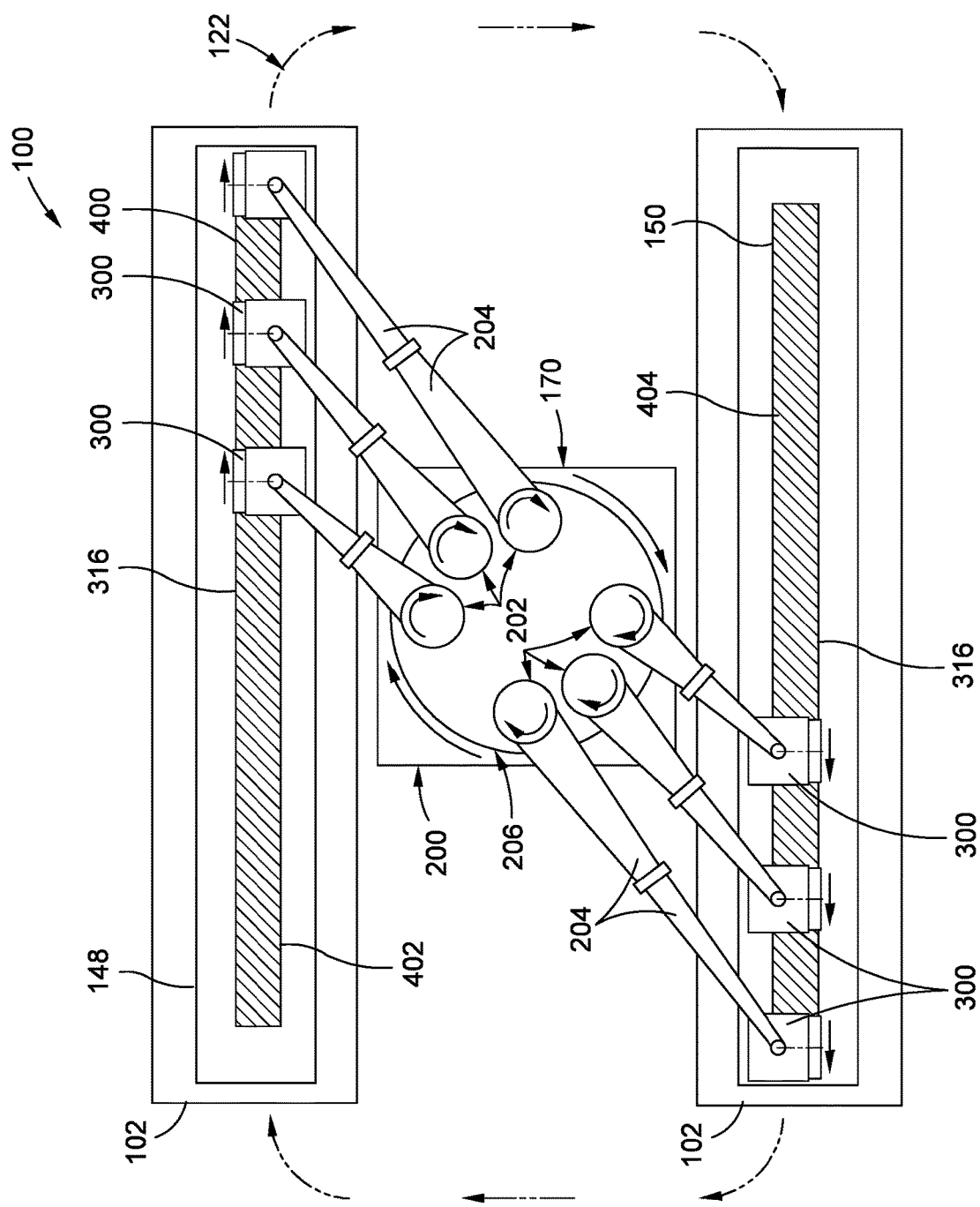
FIG. 11 is a top-down view of an example of the manufacturing system of FIG. 10 illustrating the movement of the lamination heads by the plurality of head-moving robotic devices.
Figure 12:
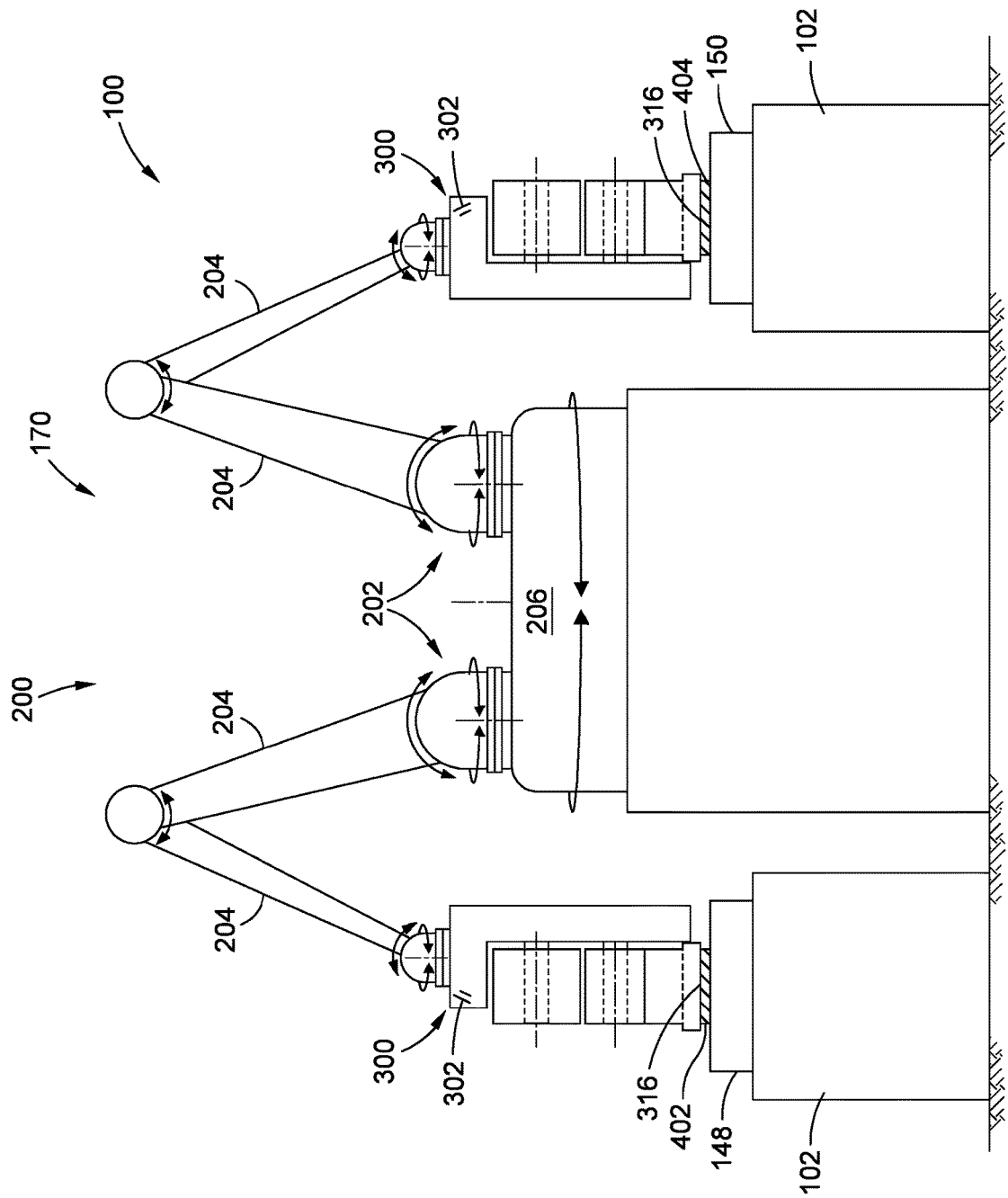
FIG. 12 is a sectional view taken along line 12 of FIG. 10 and illustrating the head-moving robotic devices respectively supporting the lamination heads.

Referring to FIGS. 10-12, shown is an example of a manufacturing system 100 in which the head-moving system 170 is configured as a head-moving robotic system 200 configured to move the lamination heads 300 along a predetermined lamination path 122. FIG. 10 is a top view of the manufacturing system 100 showing the head-moving robotic devices 202 moving a first group of three (3) lamination heads 300 as a unit along the first lamination mandrel 148 during the layup of a first composite laminate 402 while simultaneously moving a second group of three (3) lamination heads 300 as a unit along the second lamination mandrel 150 during the layup of a second composite laminate 404. However, as described above with regard to the track system 172 shown in FIG. 1, the head-moving robotic system 200 of FIGS. 10-12 may be configured to move the lamination heads 300 in series along the lamination path 122 in any one a variety of group arrangements or non-grouped arrangements of the lamination heads 300. The technical effect of the head-moving robotic system 200 is convenience in reconfiguring the lamination path 122 of the manufacturing system 100 as may be required for laying up composite laminates 400 on lamination mandrels 146 of any one of a variety of shapes, sizes and configurations, and which may be require only reprogramming of the movements of the head-moving robotic devices 202. For example, the head-moving robotic system 200 may be reprogrammed to move the lamination heads 300 along a lamination path 122 which, within the lamination station 140, may have a non-straight shape that is complementary to a non-straight lamination mandrel (not shown), as may be required for laying up a non-straight composite laminate (not shown).

FIGS. 10-11 illustrate an example of the articulation of the individual head-moving robotic arms 204 of each head-moving robotic device 202 during movement of the first group of lamination heads 300 and second group of lamination heads 300 by the plurality of head-moving robotic devices 202. Although each head-moving robotic device 202 is shown as having two (2) head-moving robotic arms 204, any one or more of the head-moving robotic devices 202 may have any number of head-moving robotic arms 204 including a single head-moving robotic arm 204.

FIG. 12 is a sectional view of the head-moving robotic system 200 showing an example of the arrangement of the head-moving robotic devices 202 mounted to the robotic system base 206 and illustrating the coupling of each lamination head 300 to the head-moving robotic arms 204. In this regard, the head-moving robotic devices 202 may be provided with rotational joints that allow sufficient degrees of freedom for moving the lamination heads 300 around the lamination path 122 while maintaining a desired (e.g., generally vertical) orientation of each lamination head 300, at least when each lamination head 300 dispenses layup material 316 onto a lamination mandrel 146.

Figure 13:
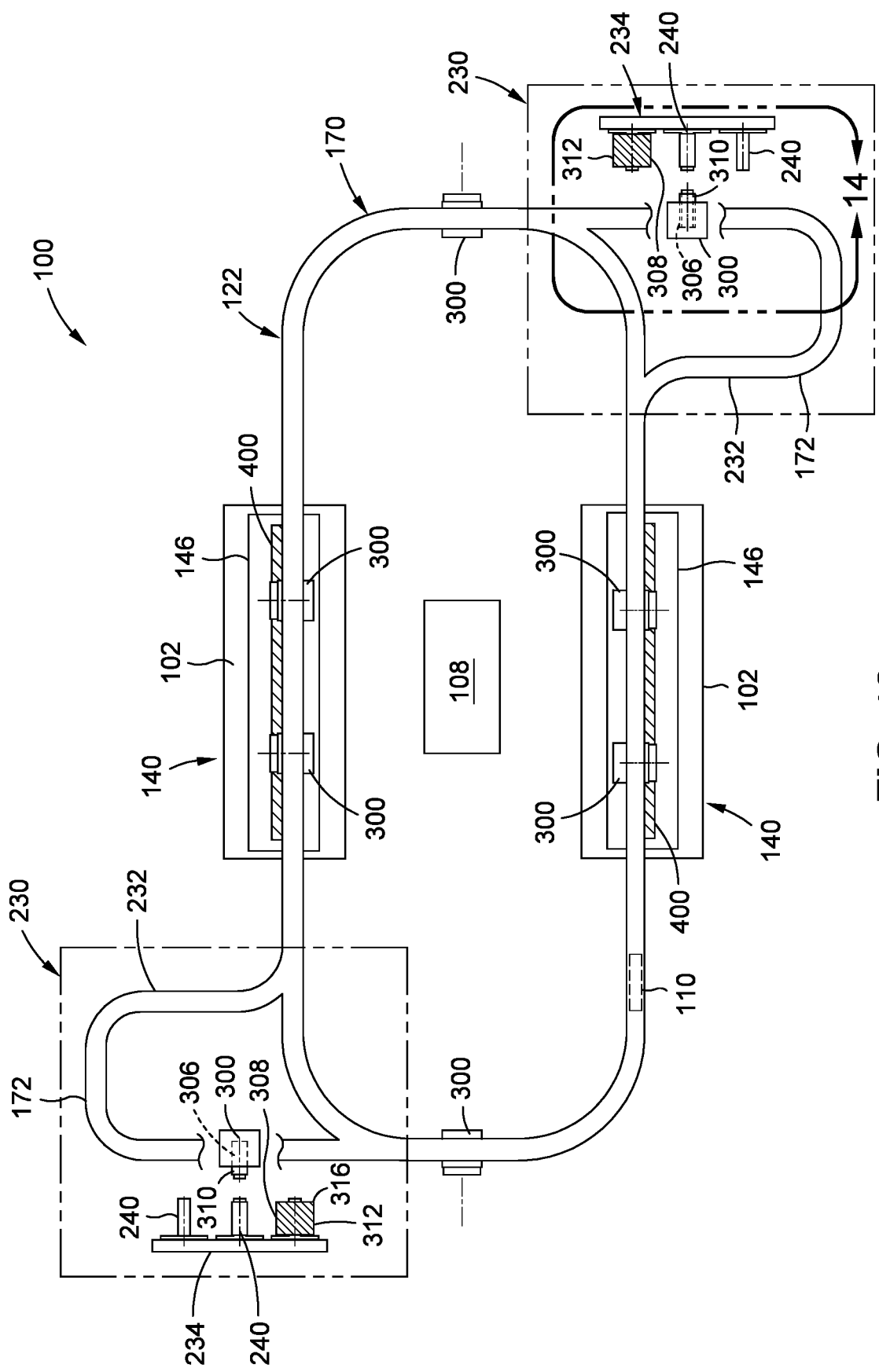
FIG. 13 is a top-down view of an example of a manufacturing system further including a reloading bay on each of opposing ends of the lamination path and containing at least one replacement material roll configured to replace a depleted material roll of a lamination head.

The head-moving robotic system 200 may include one or more head-moving robotic devices 202 each having one or more head-moving robotic arms 204 supporting one or more of the lamination heads 300. The head-moving robotic devices 202 may be mounted to one or more robotic system base 206, each of which may be rotatably supported at a location that allows the head-moving robotic devices 202 to move the lamination heads 300 along the lamination path 122 around a continuous loop. The head-moving robotic system 200 may be preprogrammed and/or controlled by the controller 106 (FIG. 2) to move the lamination heads 300 along the lamination path 122. In some examples, the head-moving robotic devices 202 may be configured to raise and lower the individual lamination heads 300 respectively at the start and end of each course of layup material 316 (FIG. 3) respectively applied by the lamination heads 300. Although not shown, the head-moving robotic system 200 may also be controlled or programmed to move the lamination heads 300 between the lamination path 122 and other paths that may be connected to the lamination path 122. For example, the head-moving robotic system 200 may be configured to move the lamination heads 300 between the lamination path 122 and the staging path 212 of the above-described staging bay 210 (FIG. 1), between the staging path 212 and the above-described spur path 222 of the above-described maintenance bay 220 (FIG. 1), and/or between the lamination path 122 and a reloading path 232 of a below-described reloading bay 230 (FIG. 13). The staging bay 210 and/or the maintenance bay 220 may each include a head holder stand (not shown) configured to hold one or more lamination heads 300 to be used as replacements for lamination heads 300 currently being circulated along the lamination path 122 by the head-moving robotic system 200.

Referring to FIGS. 13-16, shown in FIG. 13 is a top view of an example of a manufacturing system 100 having a reloading bay 230 located on each of opposing ends of the lamination path 122. Each reloading bay 230 has a reloading path 232 connected to the lamination path 122. As described below, each reloading bay 230 includes a material holder 234 containing at least one replacement material roll 312 for autonomous replacement of a depleted material roll 310 of a lamination head 300 moved from the lamination path 122 into the reloading bay 230 via the reloading path 232. The material holder 234 may contain at least one material roll 308 of the same or different material configuration than the material roll 308 to be replaced. The head-moving system 170 is configured to move a lamination head 300 from the lamination path 122 onto the reloading path 232 for replacement of a depleted material roll 310 of the lamination head 300. In the example shown, the lamination path 122 and the reloading paths 232 are each defined by a physical track system 172. In FIG. 13, the track support structures 174 (e.g., FIG. 1) have been omitted for clarity. As an alternative to a track system 172, the manufacturing system 100 of FIGS. 13-16 may include a head-moving robotic system 200 as described above and programmed to move the lamination heads 300 between the lamination path 122 and the reloading paths 232 to allow for change out of depleted material rolls 310.

Figure 14:
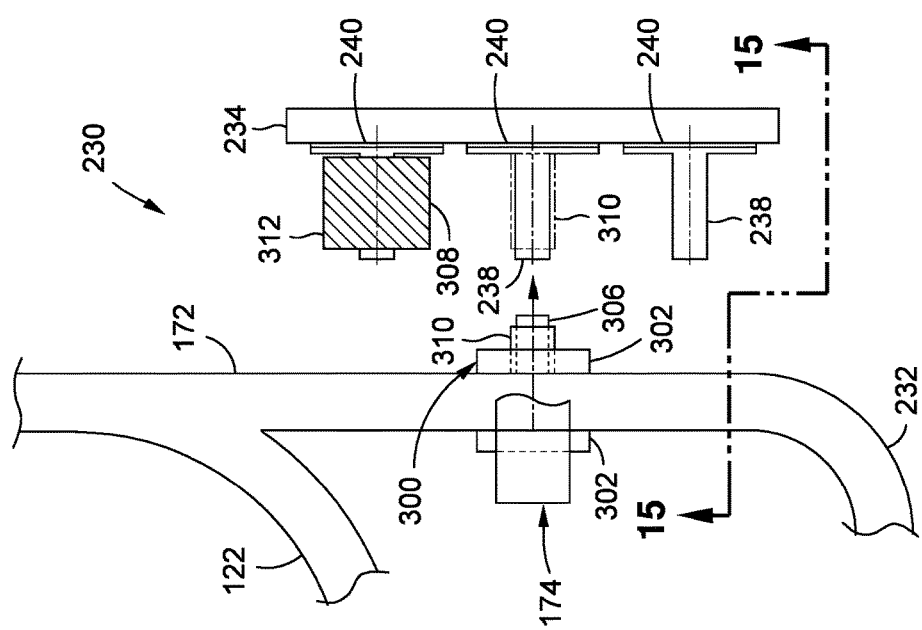
FIG. 14 is a magnified view of the encircled region of the reloading bay identified by reference numeral 14 of FIG. 13 and illustrating a material holder configured to store one or more replacement material rolls for installation on a lamination head after removal of a depleted material roll from the lamination head.

In FIGS. 13-14, each reloading path 232 may be connected to the lamination path 122 at a location outside of a lamination station 140. In some examples, a reloading path 232 may use at least a portion of the lamination path 122 to form the reloading path 232 as a continuous loop. For example, in FIG. 13, one end of each reloading path 232 is connected an end portion of the lamination path 122, and an opposite end of each reloading path 232 is connected to a side portion of the lamination path 122. However, a reloading path 232 may be configured such that both of opposing ends of the reloading path 232 are coupled to a side portion, or both of opposing ends of the reloading path 232 are connected to an end portion of the lamination path 122. The track system 172 may include a path switch (not shown) at the junction of the reloading path 232 with the side portion and/or an end portion of the lamination path 122. The path switch may be controlled by the controller 106 (FIG. 2) and may be configured to direct the lamination heads 300 onto and off of the reloading path 232. The head-moving system 170 may move one or more of the lamination heads 300 into the reloading path 232 to remove a depleted material roll 310 from the material supply drum 306 of the lamination head 300, and load a replacement material roll 312 onto the material supply drum 306. The layup material 316 on the replacement material roll 312 may be the same or different material configuration than the layup material 316 on the depleted material roll 310. During replacement of a depleted material roll 310 on a lamination head 300 on the reloading path 232, the remaining lamination heads 300 on the lamination path 122 may continue laying up one or more composite laminates 400. The technical effect of including one or more reloading bays 230 with a manufacturing system 100 is the ability to autonomously and rapidly perform material roll 308 changeouts with minimal impact on production flow. In addition, the ability to perform material roll 308 changeouts may avoid the hardware costs and system complexity of an arrangement in which an entire lamination head 300 is replaced.

Figure 15:
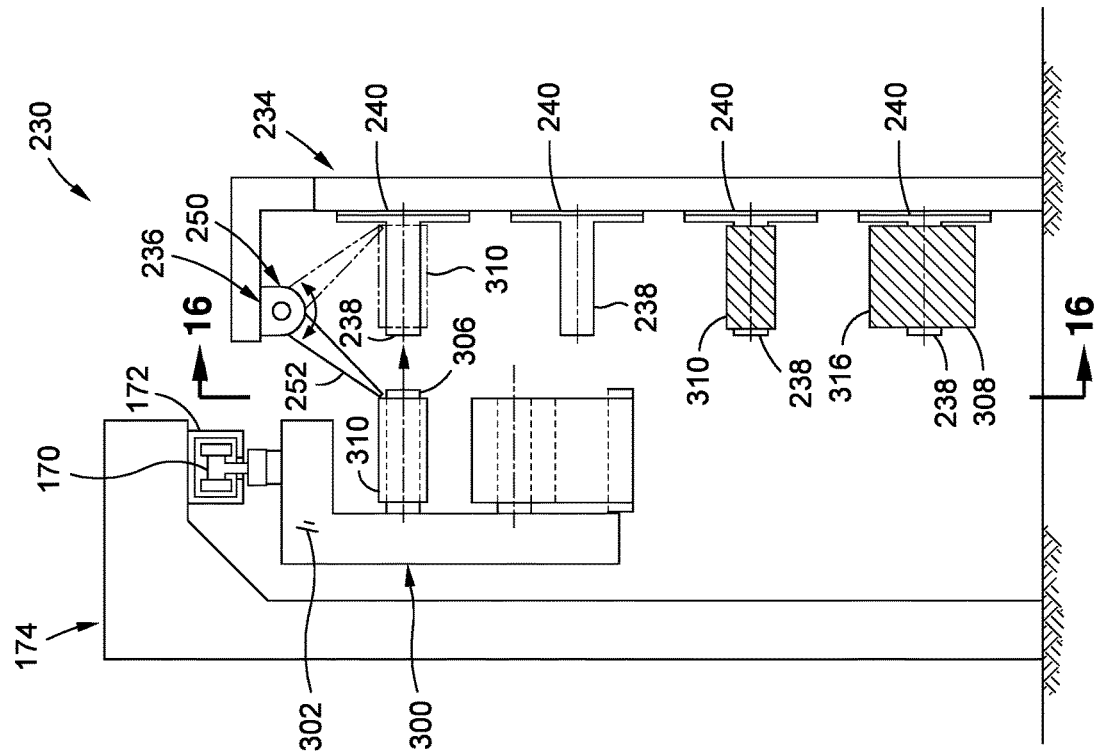
FIG. 15 is a side view of the reloading bay taken along line 15 of FIG. 14 and illustrating a material transfer mechanism configured to remove a depleted material roll from a lamination head and mount the material roll on an empty storage position of the material holder, and then install a replacement material roll on the lamination head from the material holder.

Shown in FIG. 14 is a portion of a reloading bay 230 having a material holder 234 located in fixed positioned adjacent to a portion of the reloading path 232. As mentioned above, the material holder 234 is configured to store at least one replacement material roll 312 for installation on a lamination head 300 after a depleted material roll 310 has been removed from the lamination head 300. FIG. 15 is a side view of the reloading bay 230 showing the track system 172 supporting a lamination head 300 in the material loading position 244 adjacent the material holder 234. Also shown is an example of a material transfer mechanism 236 configured to remove a depleted material roll 310 from a lamination head 300, transfer the depleted material roll 310 to an empty storage position 240 on the material holder 234, and then transfer a replacement material roll 312 from the material holder 234 to the material supply drum 306 of the lamination head 300. FIG. 16 is a front view of the material holder 234 showing a plurality of movable storage positions 240.

As shown in FIGS. 14-16, the material holder 234 may have a series or array of the storage positions 240. Each storage position 240 may be configured to support a material roll 308 such as a depleted material roll 310 or a replacement material roll 312. In the example shown, some of the storage positions 240 are occupied with replacement material rolls 312, some of the storage positions 240 are occupied with depleted material rolls 310, and one of the storage positions 240 is an empty storage position 240. In the example shown, each storage position 240 may include a spindle 238 extending laterally outwardly from the material holder 234 for supporting a material roll 308. Each spindle 238 may have an outer diameter that is sized and configured complementary to an inner diameter of the material rolls 308 to allow a material roll 308 to be slid onto and off of the spindle 238. However, the material holder 234 may be provided with any one a variety of mechanisms for supporting a material roll 308, and is not limited to an array of spindles 238.

In FIG. 16, the material holder 234 may have a storage position circulation system 242 (FIG. 16) which may be configured as a continuous loop vertical conveyor system driven by a motor (not shown) controlled by the controller 106. During operation of the manufacturing system 100, the controller 106 may continuously receive input regarding the amount of layup material 316 remaining on the material roll 308 of each lamination head 300 on the lamination path 122. Upon sensing that the material roll 308 on one of the lamination heads 300 is nearing depletion, the controller 106 may command the head-moving system 170 (FIG. 15) to move the lamination head 300 from the lamination path 122 onto the reloading path 232 and into the reloading bay 230. Once on the reloading path 232, the head-moving system 170 may move the lamination head 300 into a material loading position 244. In the material loading position 244, the depleted material roll 310 on the lamination head 300 may be positioned for alignment with an empty storage position 240 on the material holder 234. The material holder 234 may be configured to sense when a lamination head 300 has been moved into the material loading position 244. For example, the material holder 234 may include an RFID reader (not shown) configured to sense an RFID chip (not shown) mounted on each lamination head 300. Once the material holder 234 has sensed a lamination head 300 in the material loading position 244, the storage position circulation system 242 may be activated to circulate the storage positions 240 (FIG. 16) until an empty storage position 240 is aligned with the depleted material roll 310 on the lamination head 300 in the material loading position 244. In the example of FIGS. 14-16, the storage positions 240 have been circulated such that the empty storage position 240 in the uppermost location on the material holder 234 is aligned with the depleted material roll 310 on the lamination head 300 in the material loading position 244.

As shown in FIGS. 15-16, the material transfer mechanism 236 may engage the depleted material roll 310 on the lamination head 300, and transfer the depleted material roll 310 from the lamination head 300 onto the empty storage position 240 in the uppermost location on the material holder 234. In the example shown, the material transfer mechanism 236 may be configured as a reloader robotic device 250 including a reloader robotic arm 252 having an end effector (not shown) such as a vacuum pad, a gripper mechanism, or other end effector configured to engage material rolls 308. For example, the reloader robotic device 250 may be configured to engage a depleted material roll 310 on a lamination head 300 and transfer the depleted material roll 310 from the material supply drum 306 of a lamination head 300 onto an empty storage position 240 (e.g., onto a spindle 238) of the material holder 234. However, the material transfer mechanism 236 may be provided in any one a variety of different configurations for transferring material rolls 308 between the lamination head 300 and at least one of the storage positions 240 on the material holder 234.

After a depleted material roll 310 has been transferred from the lamination head 300 onto the empty storage position 240 of the material holder 234, the storage position circulation system 242 may again be activated to circulate the storage positions 240 until a storage position 240 containing a replacement material roll 312 is moved into the uppermost position on the material holder 234 such that the replacement material roll 312 is aligned with the material supply drum 306 on the lamination head 300. The reloader robotic device 250 may engage the replacement material roll 312 on the material holder 234 and transfer the replacement material roll 312 onto the material supply drum 306 of the lamination head 300. After manually or autonomously threading the layup material 316 of the replacement material roll 312 through the head components 304 (FIG. 4), the head-moving system 170 may move the lamination head 300 from the reloading path 232 back onto the lamination path 122 to resume applying layup material 316 at the lamination stations 140 (FIG. 13). The depleted material rolls 310 on the material holder 234 may be removed and replaced (e.g., manually or autonomously) with replacement material rolls 312 when the reloading bay 230 is inactive.

Although not shown, each of the lamination heads 300 may be provided in an embodiment that enables self-threading of the layup material 316 (e.g., backed material 314) through the head components 304 (FIG. 4) of the lamination head 300 following a material roll 308 change-out. For example, after completing the transfer of a replacement material roll 312 from the material holder 234 onto the material supply drum 306 of a lamination head 300 and prior to moving the lamination head 300 from the reloading path 232 back onto the lamination path 122, the head components 304 including the backing layer collection drum 338 (FIG. 4), the material supply drum 306 (FIG. 4), and the material dispensing mechanism 328 (FIG. 4) of a lamination head 300 may the configured to move relative to one another in a manner causing the autonomous (e.g., without human intervention) threading of the backed material 314 (FIG. 4) from the material supply drum 306 onto the backing layer collection drum 338. The self-threading of the backed material 314 through the head components 304 may also place the backed material 314 into engagement between the backing layer separation device 330 (FIG. 4) and the backing layer separator 332 (FIG. 4). Self-threading of the backed material 314 may additionally result in the backed material 314 being captured between the cutter platen 324 (FIG. 4) and the cutter module 326 (FIG. 4) to allow the layup material 316 to be cut during the dispensing of layup material 316 from the lamination head 300.

Figure 17:
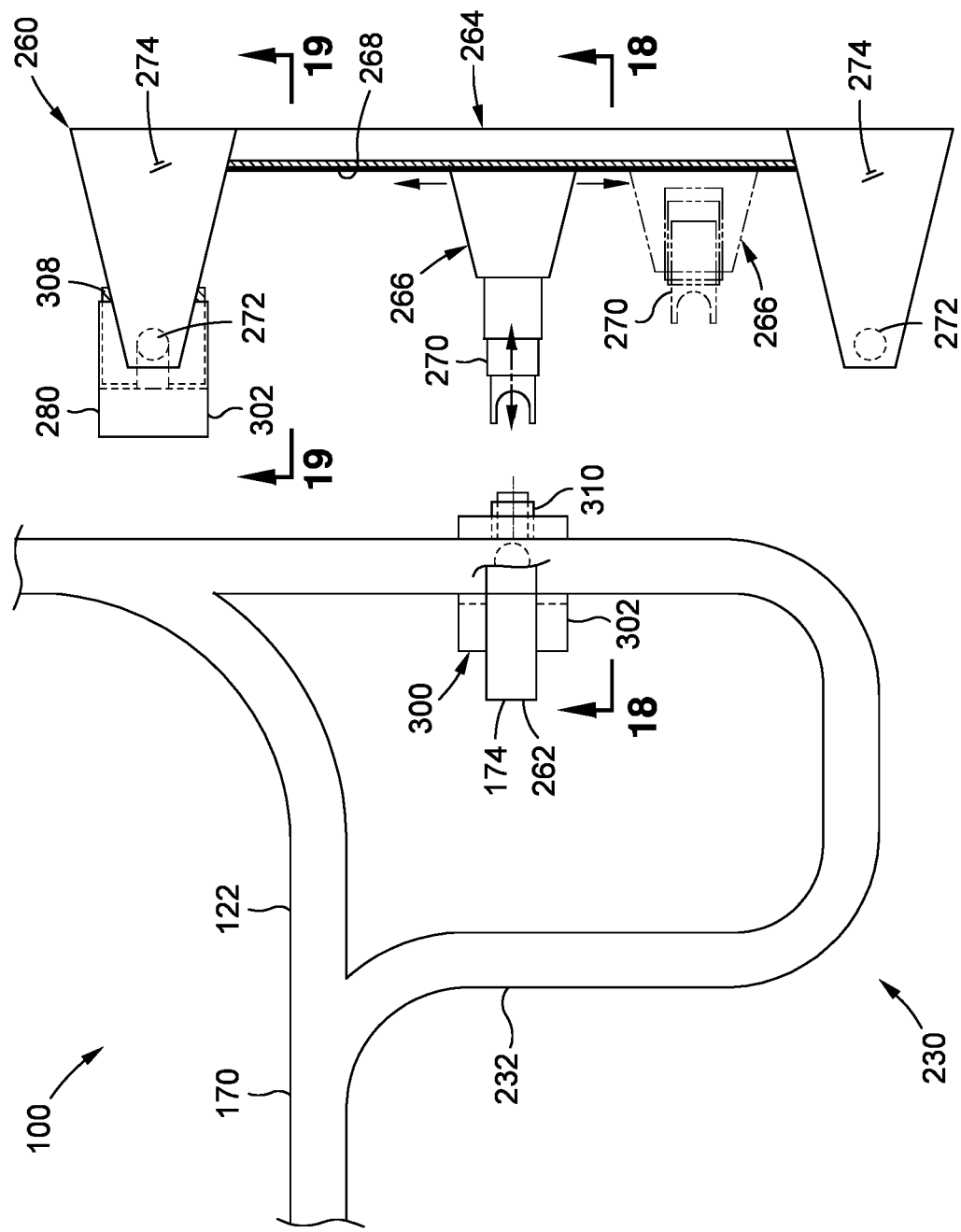
FIG. 17 is a top-down view of an example of a reloading bay having a head reloading system configured to autonomously replace a lamination head moved from the lamination path onto the reloading path.
Figure 19:
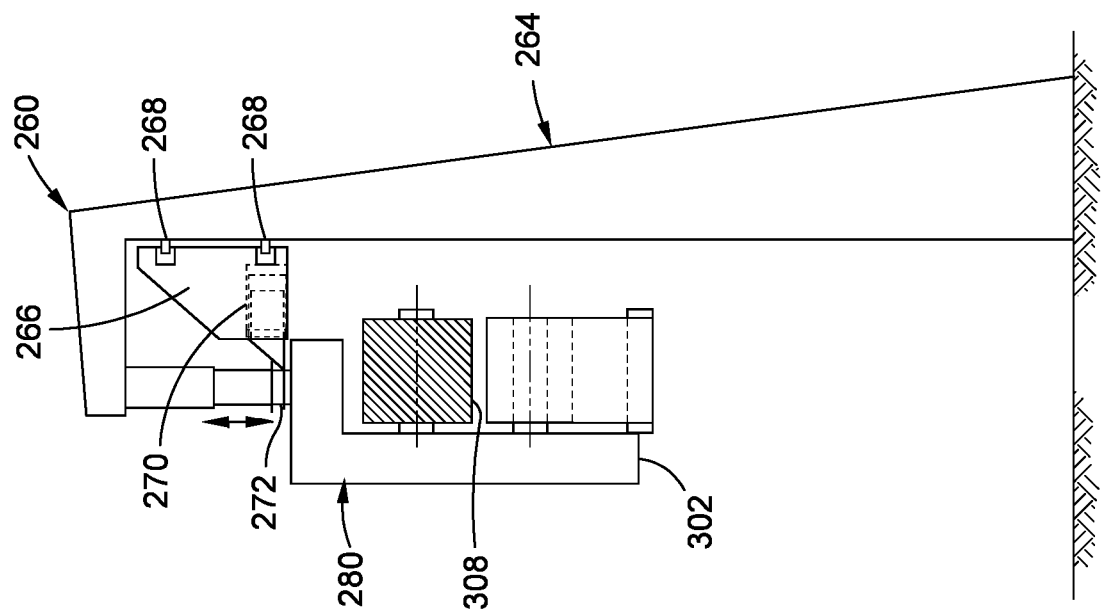
FIG. 19 is a side view of the reloading bay taken along line 19 of FIG. 17 and illustrating an example of the head transfer mechanism engaging a replacement lamination head supported by a head holder of the head loading system.
Figure 18:
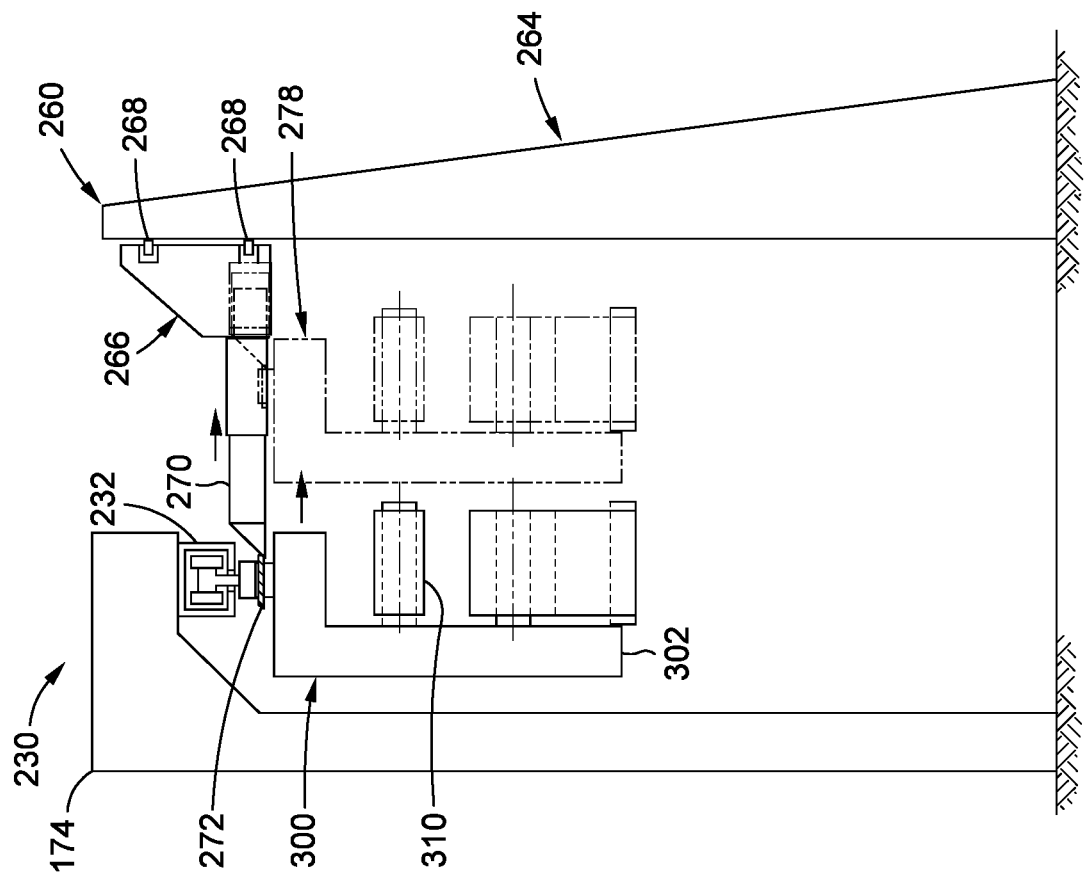
FIG. 18 is a side view of an example of the reloading bay taken along line 18 of FIG. 17 and illustrating a head transfer mechanism configured to transfer a lamination head from the reloading path to a head loading stand, and to transfer the replacement lamination head from the head loading stand onto the reloading path.

Referring to FIGS. 17-19, as an alternative to or in addition to a material reloading system (FIGS. 13-16) for replacing a depleted material roll 312 on a lamination head 300, the reloading bay 230 may include a head loading system 260 configured to replace an entire lamination head 300, such as a lamination head 300 having a depleted material roll 310. Such an arrangement may avoid the downtime associated with threading layup material 316 through the head components 304 of a lamination head 300 after changeout of a material roll. As shown in FIG. 17, the reloading path 232 may be connected to the lamination path 122 in a manner described above with regard to FIG. 13. The head loading system 260 may be positioned adjacent to a portion of the reloading path 232 such as along a generally straight section of the reloading path 232. The head-moving system 170 may move the lamination head 300 along the reloading path 232 into a head replacement position 262 in which the lamination head 300 is alignable with a movable head transfer mechanism 266 of the head loading system 260 to allow for removal of the lamination head 300 from the reloading path 232. For example, as described above with regard to FIGS. 13-16, the controller 106 (FIG. 2) may continuously receive input regarding the amount of layup material 316 remaining on the material roll 308 of each lamination head 300 on the lamination path 122. Upon detecting a near-depleted or depleted material roll 310 on one of the lamination heads 300 circulating on the lamination path 122, the controller 106 may command the head-moving system 170 to move the lamination head 300 from the lamination path 122 onto the reloading path 232 and into the head replacement position 262.

In FIGS. 17-19, the head loading system 260 may include a head loading stand 264 which may be supported on a factory floor or by other means. The head loading stand 264 may include one or more head holders 274 fixedly mounted on the head loading stand 264. As shown in FIG. 19, the head loading stand 264 may include at least one head holder 274 configured to support a replacement lamination head 280. In addition, as shown in FIG. 17, the head holding stand 264 may include at least one head holder 274 which may initially be empty but which may be configured to support a removed lamination head 278 that may removed from the reloading path 232. The head loading stand 264 may further include the above-mentioned head transfer mechanism 266 configured to remove a lamination head 300 from the reloading path 232, transfer the removed lamination head 278 to an empty head holder 274 on the head loading stand 264, engage a replacement lamination head 280 supported on another head holder 274, and transfer the replacement lamination head 280 onto the reloading path 232. In the example shown, the head transfer mechanism 266 may be horizontally movable along one or more longitudinal rails 268 that may be included with the head loading stand 264. The head transfer mechanism 266 may include a telescoping beam 270 configured to laterally extend and retract relative to the head holding stand 264 for transferring lamination heads 300 (e.g., one at a time) between the lamination path 122 and the head loading stand 264.

Similar to the above-described arrangement of FIGS. 13-16, the head loading system 260 of FIGS. 17-19 may include one or more sensors (e.g., RFID readers) configured to sense when a lamination head 300 has been moved into the head replacement position 262. Once the head loading system 260 senses a lamination head 300 in the head replacement position 262, the head transfer mechanism 266 may translate along the horizontal rails 268 into alignment with the lamination head 300, and extend a telescoping beam 270 into engagement with a head coupling mechanism 272 attaching the lamination head 300 mounting frame 302 to the reloading path 232 (e.g., track system 172). Upon engagement by the head transfer mechanism 266, the head coupling mechanism 272 may be configured to decouple the mounting frame 302 from the lamination path 122 for removal of the lamination head 300. The telescoping beam 270 of the head transfer mechanism 266 may retract the removed lamination head 278 toward the head loading stand 264, after which the head transfer mechanism 266 may translate the removed lamination head 278 along the longitudinal rails 268 toward an empty head holder 274.

In FIGS. 17-19, each head holder 274 may include a head coupling mechanism 272 configured complementary to the head coupling mechanism 272 on the lamination head 300 to allow for releasable engagement of the lamination head 300 with any of the head holders 274 on the head loading stand 264. After releasing the removed lamination head 278 to a formerly empty head holder 274, the empty head transfer mechanism 266 may translate along the longitudinal rails 268 to a head holder 274 supporting a replacement lamination head 280. Upon engagement of the replacement lamination head 280 to the head transfer mechanism 266, the head coupling mechanism 272 may release the replacement lamination head 280 to the head transfer mechanism 266 to allow for translation of the head transfer mechanism 266 along the horizontal rails 268 until the replacement lamination head 280 is aligned with the head replacement position 262 on the reloading path 232. The telescoping beam 270 of the head transfer mechanism 266 may laterally extend the replacement lamination head 280 into alignment with the reloading path 232 to allow for coupling of the mounting frame 302 to the lamination path 122 via the head coupling mechanism 272. Once the replacement lamination head 280 is coupled to the reloading path 232, the head-moving system 170 may move the replacement lamination head 280 onto the lamination path 122 for applying layup material 316 at one or more lamination stations (FIG. 13) in coordination with the remaining lamination heads 300 on the lamination path 122.

During replacement of a lamination head 300 using the head loading system 260, the remaining lamination heads 300 on the lamination path 122 may continue dispensing layup material 316 for laying up one or more composite laminates 400. Advantageously, replacing a lamination head 300 may reduce downtime of the manufacturing system 100 relative to the amount of downtime occurring during the changeout of a depleted material roll 310. In this regard, replacing an entire lamination head 300 instead of replacing a depleted material roll 310 may avoid the need to thread layup material 316 through the head components 304 of a lamination head 300 after changeout of a depleted material roll 310 with a replacement material roll 312. The technical effect of including one or more head loading systems 260 with the manufacturing system 100 is the ability to autonomously and rapidly perform lamination head 300 changeouts with minimal impact on production flow.

In the present disclosure, the operation of the manufacturing system 100 may be controlled by the controller 106 (FIG. 2). For example, the movement of the lamination heads 300 by the head-moving system 170 (FIGS. 1-6), the operation of the head components 304 of each lamination head 300 (FIG. 4), the operation of the reloading system (FIGS. 13-16 and 17-19), and the optional translation of the lamination mandrels 146 from the mandrel holding position 152, to the layup cell 120, and to the mandrel exit position 154 (FIGS. 7-8) may be controlled by the controller 106 (FIG. 2) executing computer readable program instructions that may be at least partially preprogrammed for the manufacturing of one or more composite laminates 400.

Referring briefly to FIG. 13, some examples of the manufacturing system 100 may include a control station 108 configured to allow an operator to monitor and/or control or intervene with one or more aspects of the manufacturing system 100. In the example shown, the control station 108 may be located inside a perimeter of the lamination path 122. The lamination path 122 may include a gate 110 enabling human access to the control station 108. The control station 108 allow for monitoring and control of the head-moving system 170, the individual lamination heads 300, the staging bay 210, the maintenance bay 220, and the reloading bay 230 in addition to monitoring the translation of the lamination mandrels 146 from the mandrel holding position 152, through the layup cell 120, and into the mandrel exit position 154.

Figure 20:
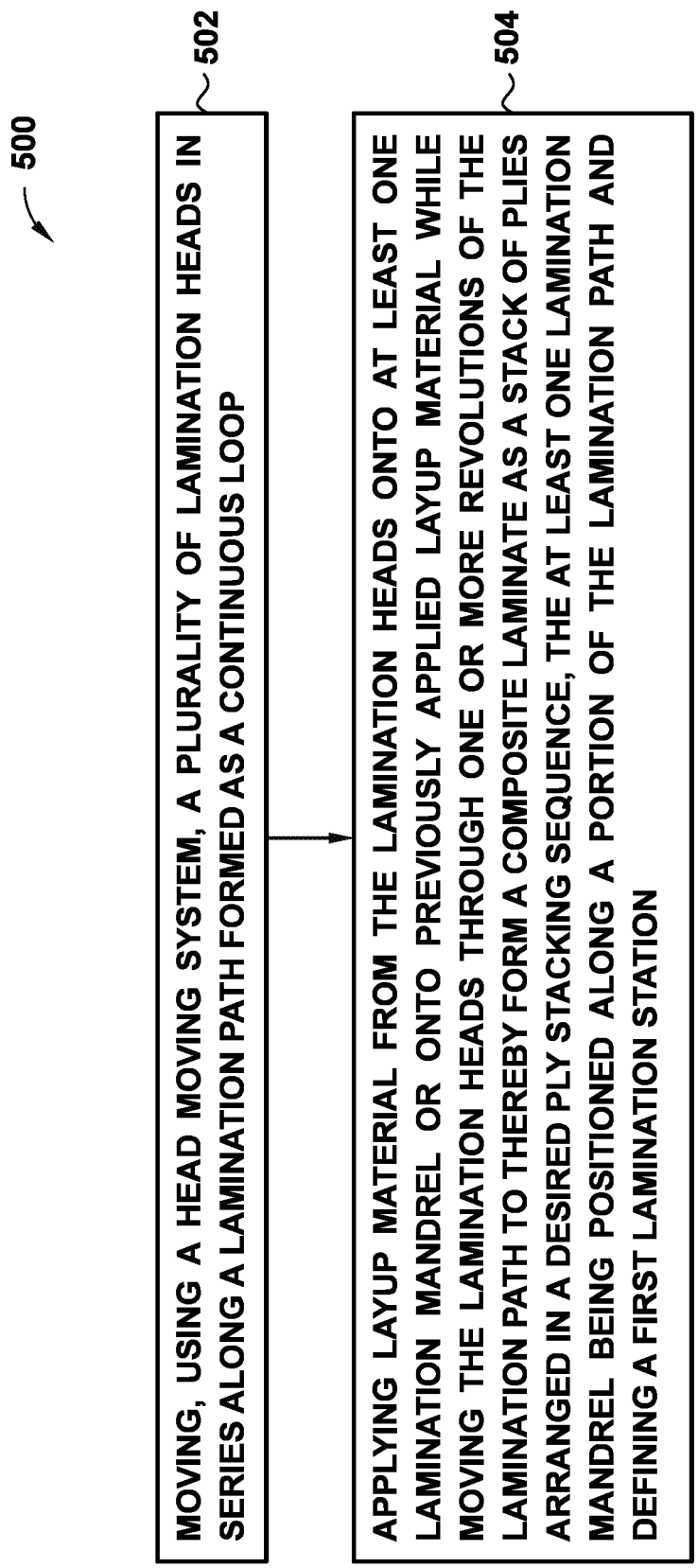
FIG. 20 is a flowchart of operations included in a method of manufacturing a composite laminate.

Referring to FIG. 20, shown is a flowchart of operations included in a method 500 of manufacturing a composite laminate 400. Step 502 of the method 500 includes moving, using a head-moving system 170, a plurality of lamination heads 300 in series along a continuous loop lamination path 122. In the example of FIG. 1, the method may include moving a plurality of lamination heads 300 along a lamination path 122 having a first side portion 124 and a second side portion 126 interconnected by a first end portion 128 and a second end portion 130. For the example in which the lamination path 122 is configured as a physical track system 172 (FIGS. 3-6), the manufacturing system 100 may include one or more motors 182 (FIG. 5) optionally engaged to a conveyor system (not shown) configured to move the lamination heads 300 independently or as one or more groups of lamination heads 300.

Referring briefly to FIG. 1, in some examples, step 502 of moving the plurality of lamination heads 300 in series along the lamination path 122 may comprise moving at least one of the lamination heads 300 along a center portion 132 of the lamination path 122 and bypassing either the first side portion 124 or the second side portion 126 during at least one revolution of at least one lamination head 300 around the lamination path 122. In FIG. 1, the center portion 132 may extend between the first end portion 128 and the second end portion 130 and may be oriented parallel to the first side portion 124 and second side portion 126. The one or more lamination heads 300 may be moved along the center portion 132 and may thereby bypass either the first side portion 124 or the second pipe portion when the lamination mandrel 146 on the remaining first side portion 124 or second side portion 126 is not needed or is undergoing maintenance.

The step 502 of moving the plurality of lamination heads 300 in series along the lamination path 122 may comprise moving the plurality of lamination heads 300 in series along a physical track system 172 (e.g., FIGS. 1 and 13) defining the lamination path 122. As described above, the plurality of lamination heads 300 may be supported by a corresponding plurality of head carriages 188 coupled to the track system 172 as illustrated in FIGS. 5-6. One or more of the head carriages 188 may include rollers (not shown) or sliding mechanisms (not shown) configured to be coupled to the track system 172 for moving the lamination heads 300 along the track system 172. The track system 172 may be supported by a track support structure 174. The head carriages 188 supporting the lamination heads 300 may be suspended from the track system 172.

As an alternative to a physical track system 172, step 502 of moving the plurality of lamination heads 300 in series along the lamination path 122 may comprise moving the plurality of lamination heads 300 in series using a plurality of head-moving robotic devices 202 (FIGS. 10-12) preprogrammed or controlled to move the lamination heads 300 along the lamination path 122. For example, as shown in FIGS. 10-12 and described above, the lamination path 122 may be defined by the preprogrammed movement of the plurality of lamination heads 300 using one or more head-moving robotic devices 202. The method may include moving the lamination heads 300 in series along the lamination path 122 in any one a variety of group arrangements or non-grouped arrangements of the lamination heads 300. To facilitate movement of the lamination heads 300, the method may include rotating a robotic system base 206 to which the one or more head-moving robotic devices 202 may be mounted.

Step 504 of the method 500 includes applying layup material 316 from the lamination heads 300 onto at least one lamination mandrel 146 or onto previously applied layup material 316 while moving the lamination heads 300 through one or more revolutions around the lamination path 122 to thereby form a composite laminate 400 as a stack of composite plies arranged in a desired ply stacking sequence. As mentioned above, the ply stacking sequence of a composite laminate 400, and therefore the order of the lamination heads 300 along the lamination path 122, may be based at least in part on the design loads to which the final composite laminate may be subjected when in service. As described above, at least one lamination mandrel 146 may be statically positioned along and/or below the lamination path 122. The location of each lamination mandrel 146 may define a lamination station 140 along the lamination path 122. In some examples, the method may include lowering each lamination head 300 onto a lamination mandrel 146 as the lamination head 300 approaches a designated start location of a course of layup material 316 to be applied by the lamination head 300. In addition, the method may include raising each lamination head 300 off of the lamination mandrel 146 when the lamination head 300 reaches a designated end location of the course of layup material 316. In some examples, the method may include stopping and restarting the application of layup material 316 onto the lamination mandrel 146 by at least one of the lamination heads 300 while the remaining lamination heads 300 continue to layup material 316 onto the lamination mandrel 146, as described above.

In some examples, step 504 of applying layup material 316 from the lamination heads 300 may include dispensing, from the lamination heads 300, layup material 316 comprising at least one of composite layup material or processing material. As described above, the composite layup material may include fiber-reinforced polymer matrix material such as dry layup material or preimpregnated layup material such as prepreg tape. In addition to dispensing composite layup material 316, the method may optionally include dispensing non-composite layup material 316 such as metallic mesh or metallic foil onto the lamination mandrel 146 or onto layup material 316 previously applied to the lamination mandrel 146. As mentioned above, the method may include dispensing processing material such as tackifier film, peel ply or any one of a variety of other processing materials that may facilitate the layup and/or processing of the composite laminate 400.

As mentioned above, step 504 of applying layup material 316 from the lamination heads 300 onto the at least one lamination mandrel 146 may comprise applying layup material 316 onto the lamination mandrel 146 positioned along at least one of a first side portion 124 and a second side portion 126 of the lamination path 122 located opposite the first side portion 124. As shown in FIG. 1, the first side portion 124 and the second side portion 126 may be interconnected by a first end portion 128 and a second end portion 130 located opposite the first end portion 128. In such an arrangement, the method may include applying layup material 316 onto a first lamination mandrel 148 and a second lamination mandrel 150 positioned respectively along the first side portion 124 and the second side portion 126 and respectively defining a first lamination station 142 and a second lamination station 144. In this regard, the first lamination station 142 may be located along the first side portion 124, and the second lamination station 144 may be located along the second side portion 126. However, as indicated above, the method may include applying layup material 316 onto any number of lamination mandrels 146 positioned at different locations along a lamination path 122, and is not limited to applying layup material 316 onto a first lamination mandrel 148 and a second lamination mandrel 150 positioned on opposite sides of the lamination path 122.

Referring to FIG. 1, in some examples, the method 500 may further include moving at least one of the lamination heads 300 between the lamination path 122 and a staging path 212 connected to the lamination path 122. The method may include storing, in at least one staging bay 210 on the staging path 212, one or more lamination heads 300 as replacements for one or more of the lamination heads 300 on the lamination path 122. In the example shown, the manufacturing system 100 includes two (2) staging bays 210 respectively located at opposite ends of the lamination path 122. Each staging bay 210 has a staging path 212 that may be formed as a continuous loop using a portion of the lamination path 122. In addition, each staging path 212 may be coupled to the lamination path 122 at a location outside of lamination station 140. When the material roll 308 on a lamination head 300 on the lamination path 122 is nearing depletion or when a different material configuration is required or when a lamination head 300 requires maintenance, the lamination head 300 may be moved from the lamination path 122 onto the staging path 212, and a lamination head 300 on the staging path 212 may be moved onto the lamination path 122 as a replacement.

For instances when a lamination head 300 requires maintenance beyond that which can be performed in the staging bay 210, the method 500 may include moving at least one of the lamination heads 300 from the lamination path 122 or staging path 212 to a maintenance bay 220 via a spur path 222 coupled to the lamination path 122 and/or the staging path 212. The maintenance bay 220 may be configured for servicing one or more lamination heads 300 beyond light maintenance or material reload that may otherwise be performed in the staging bay 210. For example, the method may include repairing or overhauling a lamination head 300 in the maintenance bay 220. The method may also include replacing a material roll 308 on one or more lamination heads 300 in the maintenance bay 220. Alternatively or additionally, the method may include reconfiguring one or more of the head components 304 in the staging bay 210. For example, the method may include changing out one or more head components 304 a lamination head 300 with head components 304 that are compatible with a new or different material configuration of layup material 316 to be loaded onto the lamination head 300.

Referring to FIGS. 13-16, in some examples, the method 500 may include moving at least one of the lamination heads 300 between the lamination path 122 and a reloading bay 230 that may be connected to the lamination path 122 via a reloading path 232. In the example shown, the manufacturing system 100 includes a reloading bay 230 on each of opposing ends of the lamination path 122. Each reloading path 232 may be connected to the lamination path 122 at a location outside of the one or more lamination stations 140 included with the manufacturing system 100. The reloading paths 232 may each be formed as a continuous loop using at least a portion of the lamination path 122. The method may include storing one or more replacement material rolls 312 in the reloading bay 230. Each reloading bay 230 may contain at least one material roll 308 of the same or different layup material 316 than the material roll 308 to be replaced. The method may additionally include replacing, with one of the replacement material rolls 312, a depleted material roll 310 on a lamination head 300 moved into the reloading bay 230 from the lamination path 122.

Referring still to FIGS. 13-16, the step of moving at least one of the lamination heads 300 between the lamination path 122 and the reloading path 232 may include moving, using the head-moving system 170, one of the lamination heads 300 into a material loading position 244 (FIG. 14) at a location along the reloading path 232 where the depleted material roll 310 on the lamination head 300 is aligned with an empty storage position 240 (FIGS. 14-15) of a series of storage positions 240 of a material holder 234 that may be fixedly positioned relative to the reloading path 232. The step of storing at least one replacement material roll 312 in the reloading bay 230 may include storing one or more replacement material rolls 312 within the storage positions 240 of the material holder 234. For example, as shown in FIG. 16, the material holder 234 may include a plurality of storage positions 240 configured as spindles 238, any one of which may support a replacement material roll 312.

The step of replacing a depleted material roll 310 with one of the replacement material rolls 312 may include engaging and removing a depleted material roll 310 from a lamination head 300 and installing the depleted material roll 310 into an empty storage position 240 of the material holder 234. For example, the reloading system may include a reloader robotic device 250 (FIGS. 15-16) configured to autonomously remove a depleted material roll 310 from the lamination head 300 and transfer the depleted material roll 310 into a storage position 240 of the material holder 234, such as by sliding the depleted material roll 310 off of the material supply drum 306 of the lamination head 300 and onto a spindle 238 of an empty storage position 240 of the material holder 234. After removal of the depleted material roll 310 from the lamination head 300, the method may include activating a storage position circulation system 242 (FIG. 16) of the material holder 234 to cause movement or circulation of the series of storage positions 240 until a storage position 240 containing a replacement material roll 312 is aligned with the material supply drum 306 of the lamination head 300 in the material loading position 244. The method may then include removing the replacement material roll 312 from the storage position 240 and installing the replacement material roll 312 on the material supply drum 306 of the lamination head 300. For example, the reloader robotic device 250 may be activated for sliding the replacement material roll 312 off the spindle 238 of the material holder 234 and onto the material supply drum 306 of the lamination head 300. After replacement of the material roll 308, the head-moving system 170 may move the lamination head 300 from the reloading path 232 back onto the lamination path 122 to resume applying layup material 316 onto at least one lamination mandrel 146.

Referring briefly to FIGS. 17-19, as an alternative to or in addition to replacing a depleted material roll 310 (FIGS. 13-16) of a lamination head 300 in the reloading bay 230, the method 500 may include autonomously replacing, with a replacement lamination head 280, a lamination head 300 moved into the reloading bay 230 from the lamination path 122. As described above, the reloading bay 230 may include a head loading system 260 as an alternative to the above-described reloading system of FIGS. 13-16. The method 500 may include storing one or more replacement lamination heads 280 on the head loading system 260. In some examples, each one of the replacement lamination heads 280 may include a new or full material roll 308 of the same or different type of layup material 316 than the layup material 316 of the replacement lamination head 280. The method 500 may include moving, using the head loading system 260, a lamination head 300 into a head replacement position 262 (FIG. 17) at a location on the reloading path 232. In addition, the method 500 may include using a head transfer mechanism 266 to decouple the lamination head 300 from the reloading path 232 (e.g., track system 172) such as by laterally extending a telescoping beam 270 of the head transfer mechanism 266 into engagement with the head coupling mechanism 272 of the lamination head 300 in the head replacement position 262, and decoupling the lamination head 300 from the track system 172.

The method 500 may include retracting the telescoping beam 270 while supporting the removed lamination head 278 to move the removed lamination head 278 toward the head loading stand 264, and then translating the removed lamination head 278 using the head transfer mechanism 266 along the longitudinal rails 268 toward an empty head holder 274 (e.g. FIG. 17). After releasing the removed lamination head 278 to the empty head holder 274, the method 500 may include translating the head transfer mechanism 266 along the longitudinal rails 268 to retrieve a replacement lamination head 280 supported by another head holder 274 (e.g., FIG. 19) of the head loading stand 264. The head transfer mechanism 266 may then translate back into alignment with the head replacement position 262 and may laterally extend the telescoping beam 270 supporting the replacement lamination head 280 for engagement to the reloading path 232 via the head coupling mechanism 272. The head-moving system 170 may then move the replacement lamination head 280 onto the lamination path 122 for applying layup material 316 along with the remaining lamination heads 300 on the lamination path 122.

Referring briefly to FIG. 7-8, in some examples, the method 500 may include holding or storing a lamination mandrel 146 in a mandrel holding position 152 that may optionally be included with the manufacturing system 100. For example, as described above, FIG. 7-8 illustrate an example of a manufacturing system 100 having a mandrel holding position 152 located on a left-hand side of a layup cell 120. As described above, the layup cell 120 contains the lamination path 122 and one or more lamination mandrels 146 located at lamination stations 140. The manufacturing system 100 may include one or more mandrel support members 102, each of which may extend along a lengthwise direction from the mandrel holding position 152 to a mandrel exit position 154 on a right- and side of the lamination path 122. The method may include moving at least one lamination mandrel 146 from the mandrel holding position 152 to a lamination station 140 in the layup cell 120 prior to applying layup material 316 onto the lamination mandrel 146 using the plurality of lamination heads 300 on the lamination path 122. In some examples, a lamination mandrel 146 may be slidably moved (e.g., along longitudinal rails 104) from the mandrel holding position 152 to a lamination station 140 using a linear drive mechanism (not shown). Alternatively, lamination mandrels 146 may be moved using a robotic device (not shown), autonomous vehicle (not shown), conveyor system (not shown), and/or the lamination mandrels 146 may be manually moved. In addition to providing a holding location for a lamination mandrel 146, the mandrel holding position 152 may provide a location for preparing each lamination mandrel 146 for receiving layup material 316 prior to the lamination mandrel 146 being moved to a lamination station 140 inside the layup cell 120.

Referring still to FIGS. 7-8, the method 500 may include moving a lamination mandrel 146 from the lamination station 140 to a mandrel exit position 154 for off-loading and/or processing of a composite laminate 400 after layup is complete. As described above, the lamination mandrel 146 may be moved along longitudinal rails 104 from the lamination station 140 to the mandrel exit position 154. After moving the lamination mandrel 146 out of the lamination station 140, the lamination mandrel 146 in the mandrel holding position 152 may be moved into the lamination station 140 for the laying up of a new composite laminate 400.

As described above, in some examples of the manufacturing system 100, the mandrel exit position 154 may also be configured as a trimming cell 160 for trimming a composite laminate 400 after layup is complete. For example, FIG. 9 illustrates an example of trimming devices 162 that may be supported by an overhead gantry 164 for trimming the composite laminate 400. For example, as shown in FIG. 8, the method may include trimming the composite laminate 400 by activating the trimming devices 162 for trimming the side edges of the composite laminate 400. The mandrel exit position 154 may also provide a location for pre-kitting the composite laminate 400 with materials and/or components that may be used in downstream processing of the composite laminate 400. For example, as mentioned above, pre-kitting of the composite laminate 400 may include assembling materials and/or components such as breather cloth, bagging film, edge sealant, and vacuum fixtures that may be off-loaded with the composite laminate 400 from the lamination mandrel 146. After off-loading of the lamination mandrel 146, the method may include circulating the lamination mandrel 146 from the mandrel exit position 154 back to the mandrel holding position 152 such as via a conveyor system (not shown), robotic system (not shown), autonomous vehicle (not shown) or other means. Any one or more of the activities performed in the mandrel exit position 154 and mandrel holding position 152 may occur concurrently with the laying up of one or more composite laminates 400 in one or more of the lamination stations 140 of the layup cell 120.

Referring briefly to FIG. 13, the method 500 may include manually monitoring, via an operator at a control station 108, the manufacturing system 100 including the laying up of one or more composite laminate 400. For example, an operator or technician may occupy the control station 108 during operation of the manufacturing system 100 allowing the operator to monitor and/or control the operation of the individual lamination heads 300 in addition to the activities occurring in the staging bay 210, the maintenance bay 220, and/or the reloading bay 230. In addition, the operator or technician may monitor the above-described translation of lamination mandrels 146 from the mandrel holding position 152 to the layup cell 120, and from the layup cell 120 to the mandrel exit position 154 (FIGS. 7-8). The control station 108 may provide the operator with the capability for controlling any one of the activities performed by the manufacturing system 100. For example, the control station 108 may include controls that allow the operator to adjust one or more parameters of any one of the operations performed by the manufacturing system. Alternatively or additionally, the control station 108 may allow an operator to stop and/or restart any one or more aspects associated with the manufacturing of one or more composite laminates 400.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:
1. A manufacturing system, comprising:
lamination heads;
a head-moving system, defining a continuous loop lamination path and configured to move the lamination heads in series along the continuous loop lamination path; and
at least one lamination mandrel positioned along a portion of the continuous loop lamination path and defining a lamination station,
wherein the lamination heads are continuously supported from above, and are each configured to dispense layup material onto the at least one lamination mandrel when the at least one lamination mandrel is directly underneath the lamination heads or onto layup material, previously applied to the at least one lamination mandrel, while the lamination heads are moved by the head-moving system through one or more revolutions of the continuous loop lamination path to lay up a composite laminate.
2. The manufacturing system of claim 1, wherein:
the continuous loop lamination path has a first side portion and a second side portion, opposing the first side portion; and
the at least one lamination mandrel is positioned along at least one of the first side portion and the second side portion.

3. The manufacturing system of claim 1, further comprising a staging bay, having a staging path, connected to the continuous loop lamination path, wherein:
the staging bay is configured to store one or more of the lamination heads on the staging path; and
the head-moving system is configured to move the lamination heads between the continuous loop lamination path and the staging path.

4. The manufacturing system of claim 3, further comprising:
a maintenance bay, comprising a spur path that is connected to the staging bay, wherein the maintenance bay is configured for at least one of servicing and replacing a material roll on one or more of the lamination heads; and
the head-moving system, configured to move the lamination heads between the staging path and the spur path.

5. The manufacturing system of claim 1, further comprising a reloading bay, comprising a reloading path that is connected to the continuous loop lamination path, wherein:
the reloading bay contains at least one of a replacement material roll or a replacement lamination head,
the replacement material roll is configured to replace a depleted material roll of one of the lamination heads on the continuous loop lamination path,
the replacement lamination head is configured to replace one of the lamination heads on the continuous loop lamination path, different than the one of the lamination heads, having the depleted material roll that the replacement material roll is configured to replace, and
the head-moving system is configured to move any one of the lamination heads from the continuous loop lamination path onto the reloading path.

6. The manufacturing system of claim 1, wherein the head-moving system comprises one of:
a track system, defining the continuous loop lamination path and supporting the lamination heads;
a head-moving robotic system, configured to support and move the lamination heads along the continuous loop lamination path.

7. The manufacturing system of claim 1, further comprising a mandrel holding location, configured to store the at least one lamination mandrel, wherein the at least one lamination mandrel is movable from the mandrel holding location to the lamination station.

8. The manufacturing system of claim 7, further comprising a mandrel exit location, configured to receive the at least one lamination mandrel and the composite laminate from the lamination station.

9. A manufacturing system, comprising:
lamination heads;
a head-moving system, defining a continuous loop lamination path and configured to move the lamination heads in series along the continuous loop lamination path, wherein the continuous loop lamination path has a first side portion and a second side portion, interconnected by a first end portion and a second end portion;
a first lamination mandrel, positioned along the first side portion and defining a first lamination station; and
a second lamination mandrel, positioned along the second side portion and defining a second lamination station, wherein:
the lamination heads are continuously supported from above,
the lamination heads are each configured to dispense layup material,
onto the first lamination mandrel and onto the second lamination station when the first lamination mandrel and the second lamination station are directly underneath the lamination heads, or
onto layup material, previously applied to the first lamination mandrel and the second lamination mandrel while the lamination heads are moved by the head-moving system through one or more revolutions of the continuous loop lamination path to lay up a first composite laminate and a second composite laminate, respectively, on the first lamination mandrel and the second lamination station.

10. The manufacturing system of claim 9, wherein:
the continuous loop lamination path comprises a center portion, extending between the first end portion and the second end portion; and
the head-moving system is configured to move the lamination heads along the center portion, so that the lamination heads bypass one of the first side portion or the second side portion during at least one revolution of the lamination heads around the continuous loop lamination path.

11. A method of manufacturing a composite laminate, comprising steps of:
moving, using a head-moving system, lamination heads along a continuous loop lamination path while the lamination heads are continuously supported from above; and
applying layup material from the lamination heads onto at least one lamination mandrel when the at least one lamination mandrel is directly underneath the lamination heads, or applying the layup material from the lamination heads onto previously applied layup material while moving the lamination heads through one or more revolutions around the continuous loop lamination path to thereby form the composite laminate, wherein the at least one lamination mandrel is positioned along a portion of the continuous loop lamination path and defines a first lamination station.

12. The method of claim 11, wherein the step of applying the layup material from the lamination heads comprises dispensing, from the lamination heads, the layup material comprising at least one of composite layup material, metallic mesh, metallic foil, and processing material.

13. The method of claim 11, wherein:
the step of applying the layup material from the lamination heads onto the at least one lamination mandrel comprises a step of: applying the layup material onto the at least one lamination mandrel, positioned along at least one of a first side portion and a second side portion of the continuous loop lamination path,
the second side portion of the continuous loop lamination path is located opposite of the first side portion, and
the first side portion and the second side portion are interconnected by a first end portion and a second end portion, located opposite the first end portion.

14. The method of claim 13, wherein the step of applying the layup material onto the at least one lamination mandrel, positioned along at least one of the first side portion and the second side portion, comprises applying the layup material onto a first lamination mandrel and a second lamination mandrel, positioned, respectively, along the first side portion and the second side portion and respectively defining the first lamination station and a second lamination station.

15. The method of claim 14, wherein:
the step of moving the lamination heads along the continuous loop lamination path comprises moving at least one of the lamination heads along a center portion of the continuous loop lamination path while bypassing either the first side portion or the second side portion during at least one revolution around the continuous loop lamination path; and
the center portion extends between the first end portion and the second end portion.

16. The method of claim 11, further comprising:
moving at least one of the lamination heads between the continuous loop lamination path and a staging path connected to the continuous loop lamination path; and
storing, in a staging bay on the staging path, one or more of the lamination heads as replacements for one or more of the lamination heads on the continuous loop lamination path.

17. The method of claim 16, further comprising moving the at least one of the lamination heads between the staging path and a spur path that connects the staging path to a maintenance bay, configured for servicing the at least one of the lamination heads.

18. The method of claim 11, further comprising steps of:
moving at least one of the lamination heads between the continuous loop lamination path and a reloading path connected to the continuous loop lamination path;
storing at least one of a replacement material roll or a replacement lamination head in a reloading bay, located on the reloading path; and
performing, on one of the lamination heads, moved into the reloading bay, a step of:
replacing, with the replacement material roll, a depleted material roll on the one of the lamination heads; or
replacing, with the replacement lamination head, the one of the lamination heads.

19. The method of claim 11, wherein the step of moving the lamination heads along the continuous loop lamination path comprises one of:
moving the lamination heads along a track system defining the continuous loop lamination path; or
moving the lamination heads using a plurality of head-moving robotic devices.

20. The method of claim 11, further comprising:
storing one or more lamination mandrels in a mandrel holding location; and
moving at least one of the one or more lamination mandrels from the mandrel holding location to the first lamination station prior to applying the layup material onto the at least one lamination mandrel using the lamination heads.

* * * * *